US011570755B2

(12) United States Patent
Bharadwaj et al.

(10) Patent No.: US 11,570,755 B2
(45) Date of Patent: Jan. 31, 2023

(54) CONTROL FORWARDING TECHNIQUES FOR WIRELESS COMMUNICATIONS

(71) Applicant: QUALCOMM Incorporated, San Diego, CA (US)

(72) Inventors: Arjun Bharadwaj, Cupertino, CA (US); Tien Viet Nguyen, Bridgewater, NJ (US); Sudhir Kumar Baghel, Hillsborough, NJ (US); Kapil Gulati, Hillsborough, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 16/745,289

(22) Filed: Jan. 16, 2020

(65) Prior Publication Data

US 2020/0236655 A1 Jul. 23, 2020

Related U.S. Application Data

(60) Provisional application No. 62/794,687, filed on Jan. 20, 2019.

(51) Int. Cl.
*H04W 72/02* (2009.01)
*H04W 28/26* (2009.01)
(Continued)

(52) U.S. Cl.
CPC .......... *H04W 72/02* (2013.01); *H04B 17/318* (2015.01); *H04L 5/0051* (2013.01);
(Continued)

(58) Field of Classification Search
CPC ..... H04W 72/02; H04W 72/04; H04W 72/10; H04W 28/26; H04W 4/40; H04W 4/46;
(Continued)

(56) References Cited

U.S. PATENT DOCUMENTS

2018/0139724 A1* 5/2018 Loehr .................... H04W 72/02
2018/0332564 A1* 11/2018 Lee ......................... H04W 4/40
(Continued)

OTHER PUBLICATIONS

Ericsson: "Contents of PSCCH for V2V Over PC5", 3GPP Draft, R1-167011, Contents of PSCCH for V2V Over PC5, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 22-26, 2016, Aug. 21, 2016 (Aug. 21, 2016), XP051140492, 3 pages, Retrieved from the Internet: URL: http://www.3gpp.org/ftp/Meetings_3GPP_SYNC/RAN1/Docs/. [retrieved on Aug. 21, 2016] paragraph [0002].
(Continued)

*Primary Examiner* — Phong La
(74) *Attorney, Agent, or Firm* — Danai Nelisile Mhembere; Holland & Hart LLP

(57) ABSTRACT

User equipment (UEs) within a sidelink communications system may employ control forwarding techniques. For example, a UE may piggyback resource reservation information received from other UEs when broadcasting its own resource reservation. A UE that may be in line of sight (LOS) with two other UEs that themselves are in a non-line of sight (NLOS) situation and may include resource reservation information associated with other UEs when broadcasting the control information. For example, when forwarding control information, a UE may identify additional resources available in a transmission interval, and may convey neighbor control information (e.g., known resource reservations of other UEs in the sidelink communications system) using the additional resources. In some cases, the piggybacked resource reservation information associated with the other UEs may be selected based on the amount of additional resources in the transmission interval, a priority of known resource reservation information, etc.

40 Claims, 13 Drawing Sheets

(51) Int. Cl.
*H04W 72/10* (2009.01)
*H04L 5/00* (2006.01)
*H04B 17/318* (2015.01)

(52) U.S. Cl.
CPC .......... *H04L 5/0082* (2013.01); *H04W 28/26* (2013.01); *H04W 72/10* (2013.01)

(58) Field of Classification Search
CPC .......... H04W 4/48; H04L 5/005; H04L 5/003; H04L 5/0051; H04L 5/0048; H04L 5/0094; H04L 5/0078; H04L 5/0082; H04B 17/318
USPC .......................................................... 370/329
See application file for complete search history.

(56) References Cited

U.S. PATENT DOCUMENTS

| | | | |
|---|---|---|---|
| 2019/0053267 A1* | 2/2019 | Kim | H04W 72/1242 |
| 2019/0116586 A1* | 4/2019 | Basu Mallick | H04W 64/00 |
| 2019/0254006 A1* | 8/2019 | Basu Mallick | H04W 72/04 |
| 2019/0306835 A1 | 10/2019 | Hoang et al. | |
| 2019/0394786 A1* | 12/2019 | Parron | H04L 27/0006 |
| 2020/0120458 A1* | 4/2020 | Aldana | H04W 4/08 |
| 2020/0154404 A1* | 5/2020 | Göktepe | H04L 1/1812 |
| 2020/0267523 A1* | 8/2020 | Tang | H04W 80/02 |
| 2020/0267671 A1* | 8/2020 | Chae | H04W 56/002 |
| 2020/0275458 A1* | 8/2020 | Khoryaev | H04W 4/44 |
| 2020/0359391 A1* | 11/2020 | Baldemair | H04L 1/0067 |
| 2020/0374656 A1* | 11/2020 | Alawieh | G01S 5/0268 |
| 2020/0383114 A1* | 12/2020 | Zhang | H04W 72/0446 |
| 2020/0413397 A1* | 12/2020 | Blasco Serrano | H04L 1/1812 |
| 2021/0029674 A1* | 1/2021 | Uchiyama | H04W 4/30 |
| 2021/0029725 A1* | 1/2021 | Liu | H04W 72/10 |

OTHER PUBLICATIONS

International Search Report and Written Opinion—PCT/US2020/014113—ISA/EPO—dated Apr. 20, 2020.
Qualcomm Incorporated: "Sidelink Resource Allocation Mechanism for NR V2X", 3GPP Draft, R1-1900887, Sidelink Resource Allocation Mechanism for NR V2X, 3rd Generation Partnership Project (3GPP), Mobile Competence Centre, 650, Route Des Lucioles, F-06921 Sophia-Antipolis Cedex, vol. RAN WG1, No. Taipei, Taiwan, Jan. 21-25, 2019, Jan. 12, 2019 (Jan. 12, 2019), XP051576424, 10 pages, Retrieved from the Internet: URL: http://www.3gpp.org/ftp/tsg%5Fran/WG1%5FRL1/TSGR1%5FAH/NR%5FAH%5F1901/Docs/R1%2D1900887%2Ezip. [retrieved on Jan. 12, 2019] paragraph [0001]—paragraph [0006]; figures 2,3.
VIVO: "Discussion on Resource Allocation Mechanism for NR V2X", 3GPP Draft, R1-1900120, Discussion on Resource Allocation Mechanism for NR Final, 3rd Generation Partnership Project (3GPP), Mobile Competence Centre, 650, Route Des Lucioles, F-06921 Sophia-Antipolis, vol. RAN WG1, No. Taipei, Jan. 21-25, 2019, Jan. 12, 2019 (Jan. 12, 2019), XP051575744, 9 pages, Retrieved from the Internet: URL: http://www.3gpp.org/ftpjtsg%5Fran/WG1%5FRL1/TSGR1%5FAH/NR%5FAH%5F1901/Docs/R1%2D1900120%2Ezip. [retrieved on Jan. 12, 2019] paragraph [0001]—paragraph [0003].

* cited by examiner

CONTROL FORWARDING TECHNIQUES FOR WIRELESS COMMUNICATIONS

CROSS REFERENCE

The present Application for Patent claims the benefit of U.S. Provisional Patent Application No. 62/794,687 by BHARADWAJ, et al., entitled "CONTROL FORWARDING TECHNIQUES FOR WIRELESS COMMUNICATIONS," filed Jan. 20, 2019, assigned to the assignee hereof, and expressly incorporated herein.

INTRODUCTION

The following relates generally to wireless communications, and more specifically to control communication techniques.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may include or support networks used for direct communications between wireless devices (e.g., direct communications between multiple UEs). Examples of direct communications include, but are not limited to, device-to-device (D2D) communications, vehicle-based communications, which may also be referred to as vehicle-to-everything (V2X) networks, vehicle-to-vehicle (V2V) networks, cellular V2X (C-V2X) networks, and the like.

Some wireless communication systems may support communications for a number of UEs, which may result in collisions or other interference on resources utilized by multiple UEs. Further, some UEs may operate according to a half-duplexing mode such that the UE may be unable to transmit and receive signals at the same time due to the effects of interference between an incoming transmission and an outgoing transmission. In systems employing half-duplex UEs or a number of UEs that are at risk of interfering with one another, resources may be assigned to UEs periodically (e.g., based on a predefined periodicity) and the resources of a certain time interval may be reserved for one or more UEs. In some cases (e.g., in cases where data packet sizes vary and resource allocation sizes are fixed), efficient scheduling of resources may be desired.

SUMMARY

The described techniques relate to improved methods, systems, devices, and apparatuses that support control forwarding techniques for wireless communications.

A method of wireless communications is described. The method may include selecting, by a first wireless device, a first transmission resource for transmission by the first wireless device and to be included in a first set of resource reservation information to be transmitted during a transmission interval. The method may further include determining one or more second transmission resources that are selected for transmission by one or more second wireless devices via respective second sets of resource reservation information, and transmitting a signal during the transmission interval, where the signal includes the first set of resource reservation information during the first set of resources and at least one of the second sets of resource reservation information during additional resources of the transmission interval.

An apparatus for wireless communications is described. The apparatus may include a processor and memory coupled with the processor. The processor and memory may be configured to select, by a first wireless device, a first transmission resource for transmission by the first wireless device and to be included in a first set of resource reservation information to be transmitted during a transmission interval. The processor and memory may be further configured to determine one or more second transmission resources that are selected for transmission by one or more second wireless devices via respective second sets of resource reservation information, and transmit a signal during the transmission interval, where the signal includes the first set of resource reservation information during the first set of resources and at least one of the second sets of resource reservation information during additional resources of the transmission interval.

Another apparatus for wireless communications is described. The apparatus may include means for selecting, by a first wireless device, a first transmission resource for transmission by the first wireless device and to be included in a first set of resource reservation information to be transmitted during a transmission interval, means for determining one or more second transmission resources that are selected for transmission by one or more second wireless devices via respective second sets of resource reservation information, and means for transmitting a signal during the transmission interval, where the signal includes the first set of resource reservation information during the first set of resources and at least one of the second sets of resource reservation information during additional resources of the transmission interval.

A non-transitory computer-readable medium storing code for wireless communications is described. The code may include instructions executable by a processor to select, by a first wireless device, a first transmission resource for transmission by the first wireless device and to be included in a first set of resource reservation information to be transmitted during a transmission interval, determine one or more second transmission resources that are selected for transmission by one or more second wireless devices via respective second sets of resource reservation information, and transmit a signal during the transmission interval, where the signal includes the first set of resource reservation information during the first set of resources and at least one of the second sets of resource reservation information during additional resources of the transmission interval.

Some examples of the method, apparatuses, and non-transitory computer-readable medium described herein may further include operations, features, means, or instructions for determining a priority associated with reservation of the one or more second transmission resources by the one or more second wireless devices, where the at least one of the second set of resource reservation information may be identified based on relative priorities. In some examples of the method, apparatuses, and non-transitory computer-readable medium described herein, the priority may be based on a distance between the first wireless device and each of the one or more second wireless devices. In some examples of the method, apparatuses, and non-transitory computer-readable medium described herein, the priority may be based on one or more reference signal received power (RSRP) parameters associated with the resource reservation information of the one or more second wireless devices.

In some examples of the method, apparatuses, and non-transitory computer-readable medium described herein, the at least one of the second set of resource reservation information included within the additional resources includes as many of the second set of resource reservation information as will fit within the additional resources, based on the priority. Some examples of the method, apparatuses, and non-transitory computer-readable medium described herein may further include operations, features, means, or instructions for aggregating respective second sets of resource reservation information to be included in the additional resources.

In some examples of the method, apparatuses, and non-transitory computer-readable medium described herein, aggregating respective second sets of resource reservation information may include operations, features, means, or instructions for using linear addition to combine at least some of the second sets of resource reservation information into a coded packet, and including as many coded packets as can fit within the additional resources.

In some examples of the method, apparatuses, and non-transitory computer-readable medium described herein, at least one of the first set of resource reservation information or the second set of resource reservation information includes a starting transmission time interval associated with a reserved resource set, an ending transmission time interval associated with the reserved resource set, a number of subchannels and a starting subchannel, a priority of the first wireless device or the second wireless device, a location information of the first wireless device or the second wireless device, a transmitter side protection parameter, a receiver side protection parameter, or some combination thereof.

Some examples of the method, apparatuses, and non-transitory computer-readable medium described herein may further include operations, features, means, or instructions for determining to forward the one or more second transmission resources that are reserved by one or more second wireless devices based on a location of the first wireless device (e.g., the forwarding device), a location of the one or more second wireless devices (e.g., the one or more devices with reservation information known to the first wireless device), a location of a receiving device (e.g., another device in the system, which may include a hidden node from the perspective of the one or more second wireless devices), a network configuration, or some combination thereof, where the signal is transmitted to the receiving device based on the determination to forward the one or more second transmission resources.

A method of wireless communications at a first wireless device is described. The method may include receiving a signal from a second wireless device, where the signal includes a first set of resource reservation information associated with one or more transmission resource reservations of the second wireless device and a second set of resource reservation information associated with one or more transmission resource reservations of one or more additional wireless devices and determining whether the one or more transmission resource reservations of the one or more additional wireless devices is to be excluded for use by the first wireless device.

An apparatus for wireless communications at a first wireless device is described. The apparatus may include a processor and memory coupled with the processor. The processor and memory may be configured to receive a signal from a second wireless device, where the signal includes a first set of resource reservation information associated with one or more transmission resource reservations of the second wireless device and a second set of resource reservation information associated with one or more transmission resource reservations of one or more additional wireless devices and determine whether the one or more transmission resource reservations of the one or more additional wireless devices is to be excluded for use by the first wireless device.

Another apparatus for wireless communications at a first wireless device is described. The apparatus may include means for receiving a signal from a second wireless device, where the signal includes a first set of resource reservation information associated with one or more transmission resource reservations of the second wireless device and a second set of resource reservation information associated with one or more transmission resource reservations of one or more additional wireless devices and means for determining whether the one or more transmission resource reservations of the one or more additional wireless devices is to be excluded for use by the first wireless device.

A non-transitory computer-readable medium storing code for wireless communications at a first wireless device is described. The code may include instructions executable by a processor to receive a signal from a second wireless device, where the signal includes a first set of resource reservation information associated with one or more transmission resource reservations of the second wireless device and a second set of resource reservation information associated with one or more transmission resource reservations of one or more additional wireless devices and determine whether the one or more transmission resource reservations of the one or more additional wireless devices is to be excluded for use by the first wireless device.

In some examples of the method, apparatuses, and non-transitory computer-readable medium described herein, the second set of resource reservation information includes a starting transmission time interval associated with the one or more transmission resource reservations of the one or more additional wireless devices, an ending transmission time interval associated with the one or more additional wireless devices, a priority of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

In some examples of the method, apparatuses, and non-transitory computer-readable medium described herein, the protection parameters may include a distance, a reference signal receive power (RSRP), or a combination thereof. Some examples of the method, apparatuses, and non-transitory computer-readable medium described herein may further include operations, features, means, or instructions for refraining from transmitting during the one or more transmission resource reservations of the one or more additional wireless devices based on at least one of the priority of the one or more wireless devices, or the distance or RSRP included in a protection parameter.

In some examples of the method, apparatuses, and non-transitory computer-readable medium described herein, the first set of resource reservation information includes a starting transmission time interval associated with the one or more transmission resource reservations of the second wireless device, an ending transmission time interval associated with the one or more transmission resource reservations of the second wireless device, a priority of the second wireless device, a transmitter side protection parameter associated with the second wireless device, a receiver side protection parameter associated with the second wireless device, or some combination thereof.

Some examples of the method, apparatuses, and non-transitory computer-readable medium described herein may further include operations, features, means, or instructions for refraining from transmitting during the one or more transmission resource reservations of the one or more additional wireless devices based on the receiver side protection parameter associated with the second wireless device, a reference signal receive power (RSRP) associated with the second wireless device, a distance between the first wireless device and the second wireless device, and feedback received pertaining to communications with the second wireless device.

Some examples of the method, apparatuses, and non-transitory computer-readable medium described herein may further include operations, features, means, or instructions for using a linear equation solving technique to recover the second set of resource reservation information associated with the one or more transmission resource reservations of the one or more additional wireless devices that may have not already been received at the first wireless device.

DETAILED DESCRIPTION

Figure 1:
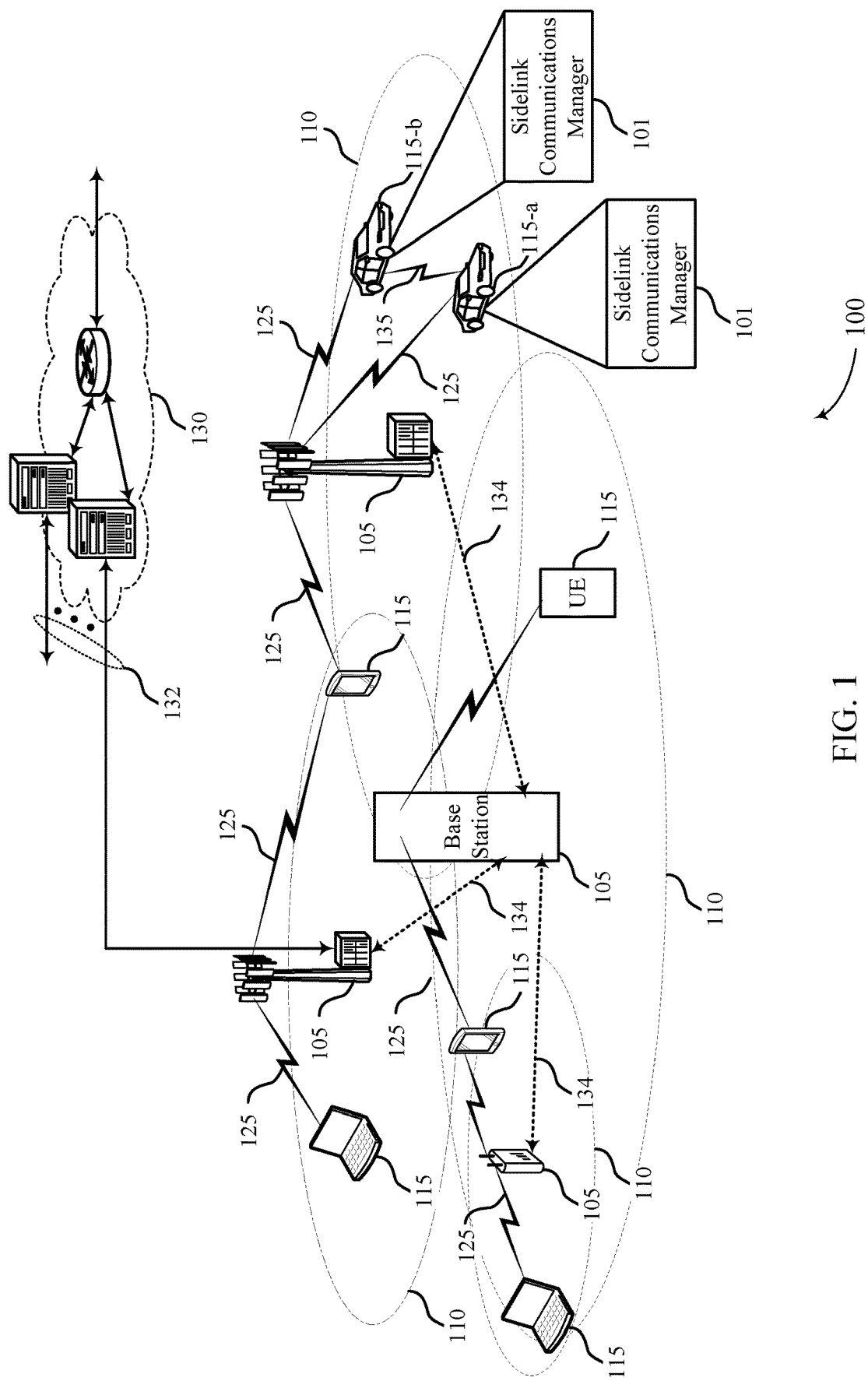
FIG. 1 illustrates an example of a system for wireless communications that supports control forwarding techniques for wireless communications in accordance with one or more aspects of the present disclosure.

Wireless communications devices operating in a sidelink communications system (e.g., a D2D system, a peer-to-peer (P2P) system, a V2X system, a V2V system, a C-V2X system, etc.) may communicate with each other using the same frequency channel. For example, a UE may attempt to receive communications from each neighboring UE in order to maintain accurate system information (e.g., to receive data for autonomous driving applications within a V2X system). Additionally, a UE in a sidelink communications system may operate according to a half-duplex mode during reception and/or transmission of data, where the UE may be unable to concurrently transmit and receive data. As such, a sidelink system may employ a dynamic resource scheduling scheme to utilize available frequency resources and may reserve resource for upcoming transmissions of a UE.

For example, a UE within a sidelink communications system may decode control channel transmissions from other UEs within the system in order to obtain information regarding the resources occupied by each respective UE. In some cases, a UE may maintain a resource map containing information regarding occupied resources, and may use this map to select resources for its own transmissions. In some examples, a UE may randomly select resources based on a hierarchy of rules and the resource map. For instance, a UE may select transmission resources that do not coincide with a transmission time interval (TTI) selected by any other UE. However, in some cases (e.g., due to non-line of sight (NLOS), pathloss, interference, etc.), such control information may not be decodable by some UEs within the sidelink communications system. For example, in urban deployments (e.g., at crossroads), sidelink blind spot situations (e.g., V2X blind spot situations), or other adverse path loss conditions, control information sent by a UE may not be received by another UE, in which case the other UE may be unaware of the UE's resource reservation (e.g., and may attempt to reserve a same resource, which may result in interference and reduced throughput within the sidelink communications system). In other examples, control information sent by a UE may not be received by another UE due to the presence of strong interference or due to the receiving UE operating in a half-duplex mode (where a UE may not be able to receive a signal due to the UE transmitting at the same time).

According to the described techniques, UEs (e.g., UEs within a wireless communications system employing sidelink transmissions, UEs within V2X systems, etc.) may employ control forwarding techniques. For example, relay of control information may aid in scenarios where two UEs are separated by a large distance (e.g., such as a few thousand meters away in line of sight (LOS)) or in a NLOS situation, and are thus unable to effectively communicate resource reservation signals (RRSs) (e.g., as one or more intermediary UEs may forward control information amongst the sidelink communications system). Relay of control information may also aid in situations of strong interference, during half-duplex operation, and other circumstances that may prevent a UE from receiving control information from another UE.

Control forwarding techniques may include, for example, a UE piggybacking resource reservation information received from other UEs when broadcasting its own signal. The signal may be either a normal data packet or a reservation signal only packet for the UE. That is, a UE that may be in the middle of other UEs that themselves are in a NLOS situation (e.g., such as a UE in a corner of a road that bends around a mountain, a UE at an intersection in a dense urban environment, etc.). In such cases, the UE may identify a resource reservation (e.g., the UE may select a first transmission resource to be to be included in a first set of resource reservation information) for a transmission, and may include resource reservation information associated with other UEs when broadcasting the control information. For example, the UE may determine one or more second transmission resources that are selected for transmission by one or more second wireless devices via respective second sets of resource reservation information, and the UE may transmit a signal including the first set of resource reservation information during the first set of resources and at least one of the second sets of resource reservation information. Therefore, in the scenario discussed above, the two UEs in a NLOS situation may receive the control information broadcast by the UE, and may identify resource reservation information associated with the broadcasting UE, as well as the resource reservation information associated with each other.

When forwarding control information, a UE may identify additional resources available in a transmission interval, and may convey neighbor control information (e.g., known resource reservations of other UEs in the sidelink communications system) using the additional resources. For example, a sidelink communications system may be associated with a resource granularity constraint (e.g., a smallest unit of schedulable resource blocks (RBs), a smallest number of schedulable TTIs, etc.). Prior to broadcasting control information, a UE may identify a transmission resource for reservation, identify an amount of resources for conveying the transmission resource for reservation, identify any additional resources arising from the resource granularity constraint, and identify resource reservation information associated with other UEs, in the sidelink communications system, to include in the broadcast. For example, the piggybacked resource reservation information associated with the other UEs may be selected based on the amount of additional resources (e.g., how many other UE's resource reservation information may be included), a priority of certain known resource reservations (e.g., priority of UEs whose reservation information is known), known distances between other UEs (e.g., if certain UEs are identified as potentially being in a NLOS situation), etc.

That is, after selecting a transmission resource (e.g., based on a hierarchy of rules and a resource map), a UE may reserve the selected resources for transmission of the signal. The UE may identify a transmission interval (e.g., one or more TTIs) for transmission based on the amount of resources to convey the reservation indication and an allocable or usable amount of resources (e.g., based on the resource granularity constraint). The UE may then identify additional resources, or padding bits, remaining in the transmission interval (e.g., due to the granularity constraints effect on the usable amount of resources, which may exceed the resources used for conveyance of the reservation indication), and use the additional resources for forwarding control information of other UEs in the sidelink communications system.

As such, other UEs (e.g., neighboring UEs in a sidelink communications system) may receive the reservation indication and maintain (e.g., update) a resource map according to the resource reservation of the broadcasting or forwarding UE, as well as according to the piggybacked resource reservation information associated with other UEs in the sidelink communications system. A resource map may be maintained at each UE individually, and may be updated as reservation information of other UEs is received. According to the described techniques, a UE may receive control information from other UEs that, in some cases, may include resource reservation information of one or more UEs in the sidelink communications system that are in a NLOS (e.g., or otherwise not in communication due to interference or operation in a half-duplex mode) with the UE. Based on the resources reserved by other UEs (e.g., including UEs separated by a relatively large distance in a NLOS situation), a UE may determine resources to utilize for transmission of a packet or signal (e.g., based on a resource avoidance mechanism involving random selection or earliest available resources, among other factors).

Aspects of the disclosure are initially described in the context of a wireless communications system. Example sidelink communications networks and process flows implementing aspects of the control forwarding techniques are then described. Aspects of the disclosure are further illustrated by and described with reference to apparatus diagrams, system diagrams, and flowcharts that relate to control forwarding techniques for wireless communications.

FIG. 1 illustrates an example of a wireless communications system 100 that supports resource reservation techniques for wireless communications in accordance with one or more aspects of the present disclosure. The wireless communications system 100 includes base stations 105 (e.g., gNodeBs (gNBs), and/or radio heads (RHs)), UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like. In some examples, a UE 115 may also refer to a vehicle (e.g., in a V2X system), a watch or a wearable device of a pedestrian, a motorcycle, a bicycle, a vulnerable road user (VRU), etc.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a P2P or D2D protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands (e.g., or frequency channels), typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands or channels from 3 GHz to 30 GHz, also known as the centimeter band. The SHF region includes channels or bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands or channels across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A method of wireless communications is described. The method may include identifying, by a first wireless device in a sidelink communications system, a first transmission resource to be selected for transmission by the first wireless device, where reservation of the first transmission resource is via transmission of a first set of resource reservation information during a transmission interval. The method may further include identifying that the transmission interval includes a first set of resources for transmission of the first set of resource reservation information and additional resources, identifying one or more second transmission resources that are selected for transmission by one or more second wireless devices via respective second sets of resource reservation information, and transmitting a data packet during the transmission interval, where the data packet includes the first set of resource reservation information during the first set of resources and at least one of the second sets of resource reservation information during the additional resources.

An apparatus for wireless communications is described. The apparatus may include a processor and memory coupled with the processor. The processor and the memory may be configured to identify, by a first wireless device in a sidelink communications system, a first transmission resource to be selected for transmission by the first wireless device, where reservation of the first transmission resource is via transmission of a first set of resource reservation information during a transmission interval. The processor and memory may be further configured to identify that the transmission interval includes a first set of resources for transmission of the first set of resource reservation information and additional resources, identify one or more second transmission resources that are selected for transmission by one or more second wireless devices via respective second sets of resource reservation information, and transmit a data packet during the transmission interval, where the data packet includes the first set of resource reservation information during the first set of resources and at least one of the second sets of resource reservation information during the additional resources.

Another apparatus for wireless communications is described. The apparatus may include means for identifying, by a first wireless device in a sidelink communications system, a first transmission resource to be selected for transmission by the first wireless device, where reservation of the first transmission resource is via transmission of a first set of resource reservation information during a transmission interval, identifying that the transmission interval includes a first set of resources for transmission of the first set of resource reservation information and additional resources, identifying one or more second transmission resources that are selected for transmission by one or more second wireless devices via respective second sets of resource reservation information, and transmitting a data packet during the transmission interval, where the data packet includes the first set of resource reservation information during the first set of resources and at least one of the second sets of resource reservation information during the additional resources.

A non-transitory computer-readable medium storing code for wireless communications is described. The code may include instructions executable by a processor to identify, by a first wireless device in a sidelink communications system, a first transmission resource to be selected for transmission by the first wireless device, where reservation of the first transmission resource is via transmission of a first set of resource reservation information during a transmission interval, identify that the transmission interval includes a first set of resources for transmission of the first set of resource reservation information and additional resources, identify one or more second transmission resources that are selected for transmission by one or more second wireless devices via respective second sets of resource reservation information, and transmit a data packet during the transmission interval, where the data packet includes the first set of resource reservation information during the first set of resources and at least one of the second sets of resource reservation information during the additional resources.

In a sidelink communications system, sidelink transmissions 135 between UEs 115 may occur within the same frequency channel. In some cases, UEs 115 within a sidelink communications system may transmit sidelink data to inform and assist vehicles within a certain vicinity (e.g., for autonomous driving applications). In some cases, a UE 115 may communicate with the core network 130 through sidelink transmissions 135. In some examples, sidelink transmissions 135 (e.g., sidelink data transmissions) may include information such as vehicle intentions (e.g., if a vehicle is to increase or decrease speed) or context notifications (e.g., if a vehicle is an emergency or police vehicle), as well as information regarding the current state of the vehicle (e.g., current speed and/or location). In some sidelink communications systems, a UE 115 may experience a half-duplex effect, where the UE 115 may be unable to transmit and receive data during the same time period. Moreover, each UE 115 may, in order to maintain accurate system information, both transmit its own data and attempt to receive each transmission (e.g., each signal, each data packet, etc.) from each neighboring UE 115. As such, a UE 115 may employ various resource scheduling schemes to avoid collisions with sidelink transmissions from other UEs 115.

In some cases, a UE 115 may use a semi-persistent scheduling scheme for transmitting sidelink communications, where communication resources may be defined by a certain periodicity (e.g., 20 ms, 50 ms, 100 ms, etc.). Additionally or alternatively, a UE 115 may employ aperiodic resource scheduling and may additionally vary data packet sizes with each transmission. For example, a UE 115 may use a dynamic resource reservation scheme to utilize available resources and thereby ensure performance metrics are met (e.g., latency requirements). In some cases, the frequency allocation size may be limited to ensure a UE 115 meets a link budget. For example, a receiving device may receive a higher amount of energy per bit of data if a transmitting device transmits using multiple time slots (e.g., continuous or discontinuous slots) for transmission instead of using multiple frequency resources.

In one example of a dynamic resource scheduling scheme (e.g., a resource avoidance mechanism), a UE 115 may determine which resources are occupied by surrounding UEs 115, may randomly select resources based on an interference avoidance scheme, and may transmit using the selected resources. In some cases, a UE 115 may select and reserve resources for transmission of signals (e.g., data packets) based on available resources (e.g., resource unoccupied by other UEs 115 in the sidelink communications system), a priority associated with the data packet, or a latency associated with the data packet, or a combination thereof.

In some examples, the UE 115 may maintain and reference a resource map to utilize when selecting resources for transmission (e.g., for transmission of a signal, data packet, etc.). The resource map may indicate resources reserved for use by other UEs 115 in the sidelink communications system, and the reserved resources may be identified through control message or reservation indications transmitted by the other UEs 115. According to techniques described herein, a UE 115 may also update its resource map based on resource reservation information of other UEs that has been received via control information forwarded by another UE. In some cases, the UE may utilize a resource window (e.g., a window of time-frequency resources) to determine resources available for transmission of the data packet by identifying time-frequency resources (e.g., TTIs) within the resource window available for use by the UE 115 or occupied by other UEs 115. Selection of the resources within the window may be based on priority of the data packet or of the traffic associated with the resources reserved by other UEs 115. Additionally or alternatively, selection of the resources may be based on earliest available resources or TTIs that are unoccupied. Further, multiple TTIs or slots within the resource window may be selected for transmission of the data packet, and the data packet may be encoded across the multiple TTIs according to a slot aggregation scheme.

After selecting resources for transmission of the data packet, the UE 115 may transmit a reservation indication to reserve resources for transmission of the data packet. In some cases, the reservation indication may indicate resources reserved for subsequent transmissions (e.g., retransmission of the data packet or any additional data transmissions). In some cases, a reservation indication may indicate reserved resources for only the next data transmission, or the reservation indication may indicate reserved resources for multiple future transmissions.

In another example, after selecting resources for transmission of the data packet, the UE can directly transmit the first transmission of the packet without sending a resource reservation signal. The UE may, additionally, reserve resources for a next transmission during the first transmission. In another example, the UE may also reserve resources for multiple future transmissions during the first transmission.

Further, according to the techniques described herein, a UE 115 may include (e.g., piggyback) resource reservation information associated with other UEs (e.g., that the UE 115 has received from neighboring UEs) in the transmitted reservation indication (e.g., in broadcast control information, forwarded RRSs, etc.). In general, UE 115 signaling for communication or conveyance of the UE's reservation indication (e.g., its resource reservation information), as well as included resource reservation information for one or more other UEs 115, may include a forwarded resource reservation, a broadcast control transmission, a multicast control transmission, a unicast forwarding transmission, a unicast resource reservation, a filler signal transmitted to reserve resources or the communications medium, etc.

A transmission resource reservation may refer to some set of reserved time and frequency resources to be used by a UE 115 for transmission (e.g., of data). A resource reservation information may generally include any information pertaining to the transmission resource reservation. For example, resource reservation information may include a starting TTI associated with the transmission resource reservation, an ending TTI associated with the transmission resource reservation, a duration or frequency range of the transmission resource reservation, a priority of the UE 115 reserving the transmission resource, a location of the UE 115 reserving the transmission resource, a transmitter side protection parameter associated with UE 115 reserving the transmission resource, a receiver side protection parameter associated with UE 115 reserving the transmission resource, or some combination thereof. As described herein, a UE 115 may convey (e.g., transmit, forward, broadcast) resource reservation information pertaining to its own transmission resource reservation, as well as resource reservation information associated with other UEs 115 in the sidelink communications system (e.g., pertaining to transmission resource reservations of other UEs 115). In some cases, resource reservation information may be referred to as a RRS, control information, a reservation indication to reserve resources for transmission, etc. In some cases a transmission resource may be referred to as a transmission interval.

In some examples, resources in a wireless communications system (e.g., in a sidelink communications system) may be associated with a resource granularity constraint. A resource granularity constraint may refer to a condition or constraint such that resources may be reserved and used according to some scheduling interval, scheduling periodicity, scheduling unit, etc. That is, in some cases, time and frequency resources in a sidelink communications system may be reserved and used in accordance with some smallest or minimum scheduling unit, such as a smallest time resource unit (e.g., a TTI, two TTIs, etc.) and/or a smallest frequency resource unit (e.g., 5 RBs, 6 RBs, 10 RBs, etc.). For example, UEs 115 in a sidelink communications system may reserve resources and transmit signals according to integer multiples of a time resource unit (e.g., 2 TTIs) and integer multiples of a frequency resource unit (e.g., 12 RBs), depending on the amount of data being transmitted.

As such, when a UE 115 prepares a signal or waveform for transmission, the UE 115 may identify an amount of information to be conveyed by the signal, an amount of resources to be used to convey the information (e.g., considering encoding and modulation of the information), as well as a transmission resource (e.g., a set of time and frequency resources) appropriate considering the amount of information to be conveyed and the resource granularity constraint. For example, if a sidelink communications system is associated with a transmission resource unit of 2 TTIs and 12 RBs (e.g., if the smallest time resource unit is 2 TTIs and/or the smallest frequency resource unit is 12 RBs) and a UE 115 identifies 3 TTIs and 18 RBs may be used to convey some information, the UE 115 may reserve and use an integer multiple of the transmission resource unit (e.g., 4 TTIs and 24 RBs).

In such cases (e.g., where resource reservation information of the UE 115 does not utilize all the resources of a transmission resource), additional resources may be available in the transmission resource. In some cases, a UE 115 may utilize bit padding techniques to add one or more extra bits to a transmission in order to make the transmission conform to a standard size (e.g., a transmission resource unit or some integer multiple of a transmission resource unit).

According to the described techniques, a UE 115 may include resource reservation information associated with one or more other UEs 115 (e.g., information pertaining to one or more second transmission resources that are selected for transmission by one or more other UEs 115 via respective second sets of resource reservation information) in additional resources (e.g., using additional bits) associated with a transmission interval (e.g., a transmission resource).

For example, a sidelink communications manager 101 (e.g., of a UE 115 in a sidelink communications system) may identify a first transmission resource to be selected for transmission. In some cases, the sidelink communications manager 101 may maintain and reference a resource map containing information regarding occupied resources (e.g., resources reserved by other UEs 115), and may use this map to select the first transmission resource. Further, the sidelink communications manager 101 may identify that a transmission interval for signaling resource reservation information corresponding to the first transmission resource (e.g., a transmission interval for signaling of an RRS, control information, etc.) includes additional resources (e.g., available resources in addition to the resources to be used for the UE's resource reservation information). As such, according to aspects of techniques described herein, the sidelink communications manager 101 may identify other transmission resources that are reserved by other UEs 115 (e.g., via the resource map), and may use the additional resources to transmit the resource reservation information corresponding to all or a selected set of the other transmission resources. The UE 115 may thus transmit or broadcast a signal (e.g., data packet), during the identified transmission interval, that includes a set of resource reservation information for the UE 115 and a set of resource reservation information for one or more other UEs 115.

Therefore, in some scenarios, a receiving UE 115 may receive the broadcast control information (e.g., including the set of resource reservation information for the broadcasting UE 115 and the set of resource reservation information for one or more other UEs), and in some cases may identify resource reservation information of another UE in the system unknown to the receiving UE 115 (e.g., due to a hidden node scenario arising from NLOS, large separation distance, interference, etc.).

For example, a UE 115 may receive the data packet or RRS from the broadcasting UE. A sidelink communications manager 101 of the receiving UE 115 may obtain (e.g., identify) the resource reservation information associated with the broadcasting device and the resource reservation information associated with the one or more additional UEs. In some cases, the sidelink communications manager 101 may update a resource map to include any new or changed resource reservation information. Further, based on the resource reservation information (e.g., and in some cases the resource map), the sidelink communications manager 101 may determine which transmission resource reservations of the UEs 115 within the sidelink communications system is to be applied (e.g., adhered to by refraining from using resources associated with the particular transmission resource reservation) by the UE 115. In other words, the sidelink communications manager 101 may determine which, if any, transmission resource reservations may be ignored (e.g., such that resources associated with the particular transmission resource reservation may be available to the UE 115) based on priority of the one or more other UEs 115, or the distance or RSRP included in a protection parameter, etc. (e.g., which may be included in the received resource reservation information).

Such utilization of additional resources in transmission intervals for conveyance of neighborhood control information (e.g., resource reservation information of other UEs in a sidelink communications system) may provide for more efficient and reliable resource reservation (e.g., as potential resource reservation conflicts arising from hidden node issues may be circumvented). Further, the use of additional resources in transmission intervals for conveyance of such information may be associated with reduced overhead compared to other (e.g., additional) signaling of such information. Ultimately, these more efficient resource reservation techniques (e.g., control forwarding techniques) may result in improved network function due to, for example, increased system throughput (e.g., as UEs 115 may identify when some resource reservations may be ignored), improved reliability (e.g., due to efficient resource reservation and reduced interference scenarios in hidden node situations), etc.

Figure 2:
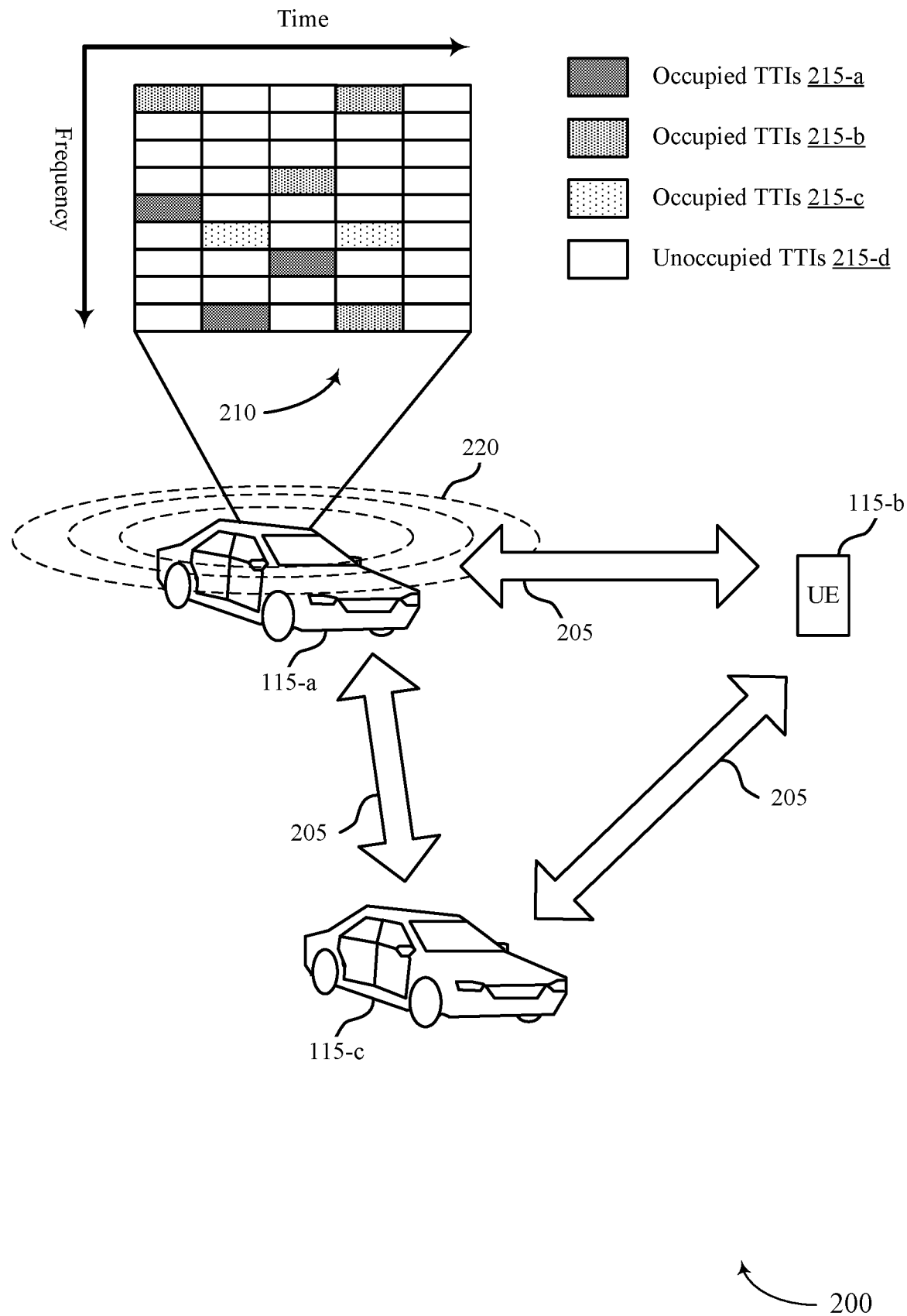
FIG. 2 illustrates an example of a wireless communications system that supports control forwarding techniques for wireless communications in accordance with one or more aspects of the present disclosure.

FIG. 2 illustrates an example of a wireless communications system 200 that supports control forwarding techniques for wireless communications in accordance with one or more aspects of the present disclosure. In some examples, wireless communications system 200 may implement aspects of wireless communications system 100, and may include UEs 115-*a*, 115-*b*, and 115-*c*, which may be examples of UE 115 described with reference to FIG. 1. In some cases, UEs 115-*a*, 115-*b*, and 115-*c* may communicate with each other within a sidelink communications system (e.g., using sidelink transmissions 205) and may employ a resource scheduling interference avoidance scheme to dynamically select and use transmission resources. Additionally, as described herein, UEs 115-*a*, 115-*b*, and 115-*c* may employ control forwarding techniques for improved resource reservation within the wireless communications system 200.

UEs 115 may communicate via sidelink transmissions 205 in order to maintain accurate system information (vehicle data, scheduled resources, etc.). Wireless communications system 200 may employ reserved resource techniques where UEs 115 may reserve resources (e.g., within the sidelink communications system) for transmissions.

According to some aspects, UEs (e.g., UE 115-*a*) may construct and maintain a resource map 210 to identify and determine which resources within the sidelink frequency channel are reserved or occupied by other UEs in the system (e.g., UEs 115-*b* and 115-*c*). When a UE 115 has data for transmission, the UE 115 may reference the resource map 210 to identify available resources and select a set of available resources for the transmission. The UE 115 may then transmit or broadcast transmissions 220 that indicates the selected resources reserved for transmission of the data packet (e.g., to reserve resources for future transmissions). In some cases, a resource reservation for a data packet may indicate resources to be used for a following transmission, such as a retransmission and/or a transmission of subsequent data.

For example, UE 115-*a* may transmit or broadcast a transmission 220 to indicate resource reservation information. Additionally, UE 115-*a* may receive transmissions 220 from UEs 115-*b* and 115-*c*, and may use current and previous resource reservation information to construct the resource map 210. Resource map 210 may thus indicate resources (e.g., TTIs 215-*a*, 215-*b*, and 215-*c*) that are occupied by UEs 115-*a*, 115-*b*, and 115-*c*, respectively, and may also indicate unoccupied resources (e.g., available or unoccupied TTIs 215-*d*). As discussed herein, UE 115-*a* may use resource map 210 to select resources (e.g., one or more TTIs 215) to use for its own sidelink transmissions 205, which may also be selected based on availability and/or an interference avoidance scheme.

Transmissions 220 may include resource reservation information that indicates, for example, a length of a transmission (e.g., initial transmission length and/or total transmission length), which may, in some cases, remain the same for any subsequent transmission (e.g., retransmission). In some cases, UE 115-*a* may indicate resource reservations using a slot index and a subchannel index. The slot index may include a defined number of bits (e.g., six bits), a subchannel index may include a different defined number of bits (e.g., four bits), and the overall reservation indication may contain a total of the slot index bits and subchannel index bits (e.g., 10 bits). In some examples, the slot index may indicate a reservation for a slot (e.g., a TTI 215) corresponding to a specified number of slots following a transmission 220. Additionally or alternatively, the slot index may indicate a reservation for a slot (e.g., a TTI 215) corresponding to a specified number of slots following the last slot of the transmission. The subchannel index may indicate a reservation for a subchannel corresponding to a specified number of subchannels from the start or from the end of a subchannel resource pool. In some cases, the subchannel may be defined as a given amount (e.g., minimum or maximum) of a frequency spectrum that a transmission resource (e.g., TTI 215) may occupy.

UE 115-*a* may begin selecting transmission resources by defining a window for resource selection within the sidelink transmission resources (e.g., using resource map 210). For example, UE 115-*a* may define a window based on whether a transmission is an initial transmission or a retransmission, based on latency requirements of a data packet, or based on a soft-buffer requirement of UE 115-*a* (e.g., UE 115-*a* may only be able to store data for up to 16 ms). Within the defined window, UE 115-*a* may select one or more TTIs 215 for transmission by identifying one or more candidate TTIs 215. For example, UE 115-*a* may use resource map 210 to identify TTIs 215-*b* (e.g., resources occupied by UE 115-*b*)

and TTIs 215-*c* (e.g., resources occupied by UE 115-*c*) and may determine to exclude these resources from selection based on the resources being occupied. Additionally or alternatively, UE 115-*a* may identify candidate TTIs 215 based on a distance between UE 115-*a* and either UE 115-*b* or 115-*c*. For example, if UE 115-*c* has reserved TTIs 215-*c*, but UE 115-*c* is beyond a threshold distance from UE 115-*a* (e.g., as indicated in a transmission 220 broadcast by UE 115-*c*), UE 115-*a* may identify TTIs 215-*c* as candidate resources. In some cases, UE 115-*a* may also identify candidate TTIs 215 based on a latency requirement of a data packet to be sent. For example, UE 115-*a* may have a latency threshold requirement and may identify TTIs 215 that satisfy the requirement.

In some examples, UE 115-*a* may select resources based on a hierarchy of rules (e.g., an interference avoidance scheme) and candidate resources identified using resource map 210. In some cases, UE 115-*a* may first attempt to randomly select an unoccupied TTI 215-*d* that may not coincide in time with any other reserved TTI 215-*a*, 215-*b*, or 215-*c* (e.g., in order to avoid half-duplex effects). For example, UE 115-*a* may select an unoccupied TTI 215-*d* from the last column (e.g., right-hand column) of resource map 210 or from another column that may include only unoccupied TTIs 215-*d*. Additionally or alternatively, an earlier unoccupied TTI 215-*d* may be preferred over a later unoccupied TTI 215-*d* (e.g., instead of the selection process being completely random). For example, in some cases, UE 115-*a* may select the earliest unoccupied TTI 215-*d* that does not coincide in time with another TTI 215-*d*.

In some cases, UE 115-*a* may be unable to transmit on or unable to find an unoccupied TTI 215-*d* that does not coincide in time with other transmissions. Therefore, UE 115-*a* may proceed to select unoccupied TTIs 215-*d* that may be multiplexed in frequency with retransmissions from UE 115-*b* or 115-*c*, where the retransmissions may correspond to original transmissions that UE 115-*a* may have successfully decoded. For example, UE 115-*a* may determine (e.g., from received transmissions 220) that TTIs 215-*b* and 215-*c* within the second-to-last column of resource map 210 are retransmissions, and may further determine that UE 115-*a* has already successfully decoded the original transmissions corresponding to the retransmissions. As such, UE 115-*a* may proceed to select an unoccupied TTI 215-*d* within the second-to-last column of resource map 210 (e.g., for transmission, as the UE 115-*a* may not need to receive a transmission during that TTI).

In some cases, TTIs 215-*a*, 215-*b*, and 215-*c* may contain resources dedicated to HARQ feedback, which all other UEs 115 may decode as part of constructing a resource map 210. In some examples, a transmitting UE 115-*a* may not receive any negative acknowledgement (NAK) feedback from either UE 115-*b* or 115-*c* regarding a sidelink transmission 205 (e.g., corresponding to one or more TTIs 215-*a*) and may therefore determine to release any TTIs 215-*a* reserved for retransmission. As such, UE 115-*a* may indicate (e.g., via a resource reservation information) that it has released the retransmission resources and UEs 115-*b* and 115-*c* may update their respective resource maps 210 accordingly. Additionally or alternatively, UE 115-*a* may receive a NAK corresponding to the sidelink transmission 205 and may therefore determine to continue retransmitting on any reserved retransmission resources (e.g., resource maps 210 may therefore remain unchanged). In some examples, UE 115-*a* may be unable to process a NAK (e.g., due to collisions or results of the half-duplex constraint) and may therefore determine to continue to transmit on the resources reserved for retransmission. Additionally or alternatively, if UE 115-*a* is unable to process a NAK but determines that a received power level is below a given threshold (e.g., indicating that a UE 115 transmitting a NAK may be beyond a certain distance), UE 115-*a* may determine to release its retransmission resources. In some cases, the action to be taken by a UE 115 may be a part of the configuration of said UE 115 (e.g., based on UE capability).

Once UE 115-*a* identifies a transmission resource to be selected for transmission (e.g., selects one or more TTIs 215 using techniques described above), the UE 115-*a* may broadcast resource reservation information (e.g., a transmission 220). As discussed herein, UE 115 selection of a set of TTIs 215 for transmissions may involve selecting unoccupied resources (e.g., unoccupied TTIs 215-*d*) based on a size of the data packet (e.g., where the TTIs 215 may be defined based at least in part on some resource granularity constraint of the wireless communications system 200). In some cases, the data packet to be transmitted may not necessarily use the entirety of the resources of a TTI, resulting in additional resources.

For example, a transmission 220 may include resource reservation information corresponding to a data packet size conveyable by, for example, half a TTI 215, one and a half TTIs 215, etc. In such cases, additional resources of the TTI 215 may be used to convey resource reservation information of other UEs 115. In such cases, UE 115-*a* may identify resource reservation information (e.g., which may include UE 115-*b* and/or UE 115-*c* reserved resource information from resource map 210) based on the amount of additional resources available (e.g., based on how much resource reservation information of other UEs 115 may be included). In some cases, the additional resources (e.g., the additional resource of the transmission interval) may be referred to as padding bits. That is, control forwarding using additional resources (e.g., padding bits) of a transmission interval may be used for short packets where a transmission interval unit is not being filled, or for larger packets where the transmission interval of some integer multiple of a transmission interval unit is not being filled.

As discussed, when a UE 115-*a* wishes to reserve a transmission resource for a transmission, the UE 115-*a* may broadcast a resource reservation signal. For example, in some cases, transmission resources for data transmission may not presently be available for UE 115-*a*, and the UE 115-*a* may broadcast some small signal in a small available resource to reserve a future resource. In such cases, additional bits (e.g., used to convey resource reservation information of other UEs 115) may be included in the broadcast to fill the resource granularity unit (e.g., to avoid resource fragmentation, such that the resource granularity in wireless communications system 200 is constant).

In some cases, when the UE 115-*a* wishes to transmit data, UE 115-*a* may immediately search for a free resource and transmit the data in an available or unoccupied resource. In cases where the transmission fails (e.g., negative feedback is received) the UE 115-*a* may reserve a resource for a future retransmission (e.g., by first broadcasting a resource reservation signal according to aspects of the control forwarding techniques described herein). In other cases, the UE 115-*a* may search for a small gap of available resources, and may transmit a short reservation signal (e.g., or filler signal) that may reserve more resources in the future for transmission of the data. In such cases, when the UE 115-*a* transmits the short filler signal, the UE 115-*a* may implement aspects of the control forwarding techniques described herein (e.g., after the short filler signal in additional resources prior to the beginning of the resources to be used for the data transmission).

Figure 3:
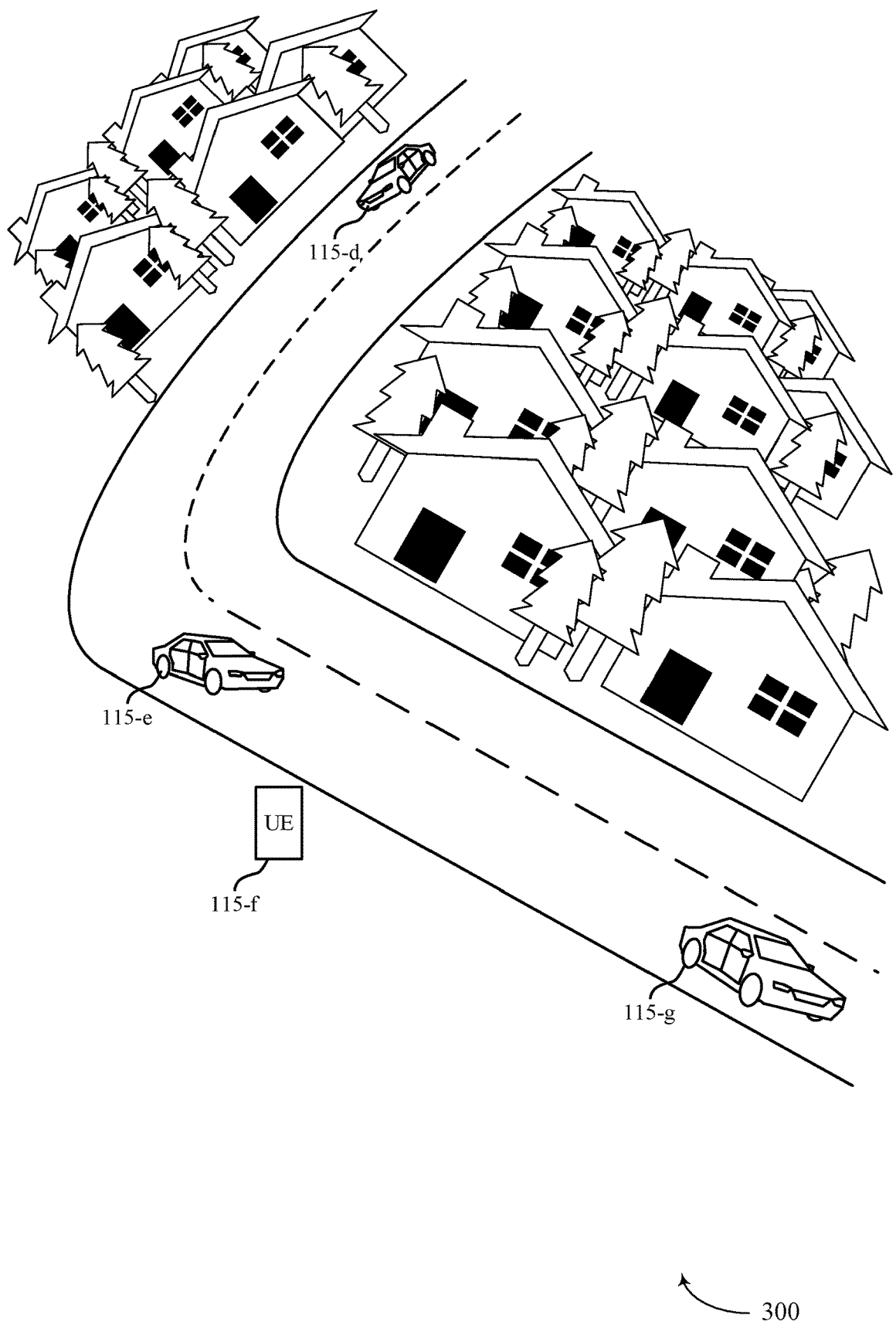
FIG. 3 illustrates an example of a sidelink system that supports control forwarding techniques for wireless communications in accordance with one or more aspects of the present disclosure.

FIG. 3 illustrates an example of a sidelink communications system 300 that supports control forwarding techniques for wireless communications in accordance with one or more aspects of the present disclosure. In some examples, sidelink communications system 300 may implement aspects of wireless communications system 100 and wireless communications system 200, and may include UEs 115-d, 115-e, 115-f, and 115-g, which may be examples of a UE 115 described with reference to FIGS. 1 and 2. In some cases, UEs 115-d, 115-e, 115-f, and 115-g may employ a resource scheduling interference avoidance scheme to dynamically select and use transmission resources, and may employ control forwarding techniques, for improved resource reservation within the sidelink communications system 300. In some cases, sidelink communications system 300 may illustrate an example of a V2X system, a V2V system, a D2D system, a P2P system, etc.

In a highway sidelink communications environment (e.g., in a V2X environment) including multiple UEs, each UE may be in LOS to other UEs. Therefore, UEs in the highway sidelink communications environment may effectively broadcast and receive control information, and may refrain from using resources that may overlap with reserved resources by other UEs in LOS based on the broadcast information. That is, UEs may identify reserved resources of other UEs based in part on received resource reservation signals, and based on distance(s) from broadcasting UEs (e.g., as in some cases resources reserved by a UE far away may be effectively available for use). For example, a transmitting UE may then determine an exclusion distance value that may be based in part on a communication range (e.g., of a packet transmission range based in part on a QoS of the packet, and the like), and determine whether the distance(s) to the other UEs is inside or outside the exclusion distance value. As a result, if the another UE is within the exclusion distance value and in LOS to the transmitting UE 115, the transmitting UE 115-a may refrain from transmission on reserved resources by the other UE (i.e., within the protection zone and in LOS to the transmitter UE).

Alternatively, in some environments (e.g., such as an environment illustrated by sidelink communications system 300), a transmitting UE (e.g., UE 115-d) may be in a NLOS to other UEs (e.g. UE 115-g). For example, some urban (e.g., residential, commercial) environments may provide situations (e.g., intersections in a dense urban environment) where UEs 115 may be in NLOS to each other. Other examples, may include corners of roads that bend around a mountain or other interfering structure, some stacked highway or underground tunnel situations, etc. As a result, the other UEs (e.g., UEs 115-e and 115-f) may be susceptible to interference from transmissions by UEs 115-d and 115-g, as UEs 115-d and 115-g may not be able to receive each other's control information and thus may be unaware of resources reserved by the other device. By way of example, for some V2V communications scenarios, UE 115-d and UE 115-g may be in a same neighborhood (or proximate to each other) and may be in NLOS to each other (e.g., a crossroad, a bend around a subdivision, traveling on opposite sides of a highway, and the like).

If a UE 115-g cannot receive resource reservation information from UE 115-d, packet transmission from UE 115-d and/or UE 115-g may take place in the same or overlapping transmissions. As such, there may be interference on receiving UE 115-e and/or receiving UE 115-f. For example, when UE 115-d broadcasts control information, UEs 115-e and 115-f may receive the resource reservation information, but UE 115-g may not (e.g., due to blockage, NLOS, path loss, etc.). If UE 115-g decides to use the same transmission resource (e.g., as it is unaware of UE 115-d reservation of the transmission resource), interference between transmissions by UE 115-d and UE 115-g may result in failed or otherwise inefficient reception at UEs 115-e and 115-f. In some cases, UE 115-g may be referred to as a hidden node, from the perspective of UE 115-d. In NLOS situations, pathloss may increase significantly with distance between the UEs 115-d and 115-g, and control information may not be decodable for an increasingly large exclusion zone (e.g., whereas in highway or other LOS situations, pathloss may be low and signals may travel up to, for example, 1000 m).

As such, sidelink communications system 300 may implement control forwarding techniques described herein. For example, UE 115-d may broadcast control information including resource reservation information, which may be received by UE 115-e and UE 115-f. When either UE 115-e or UE 115-f broadcast a signal, they may forward control information received from UE 115-d. As UE 115-g may receive such a broadcast from UE 115-e and/or UE 115-f, UE 115-g may identify resource reservation information associated with UE 115-d, and may accordingly avoid selection of, and transmission over, any resources that may interfere with UE 115-d transmissions. That is, in the example situation of FIG. 3, UE 115-e and UE 115-f may both be in LOS of UE 115-d and UE 115-g, although UE 115-d may be in NLOS of UE 115-g. As such, UE 115-e and UE 115-f may utilize control forwarding techniques such that UE 115-d and UE 115-g may be able to receive and identify each other's resource reservation information.

In some cases, UEs 115 may determine whether to forward (e.g., indicate, piggyback, etc.) resource reservation information for other UEs 115 based on a network configuration (e.g., a configuration of sidelink communications system 300), positioning information of UEs 115 within the system, etc. For example, in some cases, UE 115-f may forward resource reservation information associated with UE 115-d based on a location of UE 115-f, a location UE 115-d, a location of UE 115-g, locations of other UEs 115, etc. For example, UE 115-f may determine to forward resource reservation information based on UE 115-f being located at a corner of an intersection or based on UE 115-f being located at some probable/favorable relay point for other UEs 115 that may be in NLOS with each other. In some cases, UE 115-f may be, for example, a watch or a wearable device of a pedestrian, a motorcycle, a bicycle, a VRU, etc. In some cases, UE 115-f may be another vehicle. In some cases, UEs 115 may determine whether to forward resource reservation information for other UEs 115 based on network configuration. For example, sidelink communications system 300 may configure all UEs to forward all resource reservation information, may configure certain UEs to forward resource reservation information (e.g., based on global positioning system (GPS) information of the UEs, based on priority of the UEs, etc.), may configure forwarding of certain resource reservation information (e.g., forwarding of resource reservation information associated with a certain priority), etc.

As another example, UE 115-d may broadcast resource reservation information indicating a reserved transmission resource. UE 115-f may receive the resource reservation information of UE 115-d, and may piggy back the resource reservation information of UE 115-d with its own resource reservation information, and broadcast its own resource reservation information and the resource reservation information of UE 115-*d* during a transmission time interval. UE 115-*g* may reserve the two sets resource reservation information via the broadcast from UE 115-*f*, and UE 115-*g* may update a resource map to include the resource reservation information associated with of UE 115-*d*. As such, in cases where UE 115-*g* receives a feedback transmission (e.g., HARQ feedback) from, for example, UE 115-*e*, UE 115-*g* may identify an association of the feedback transmission. For example, UE 115-*g* may receive a negative acknowledgement or negative feedback from UE 115-*e*, and may identify the feedback transmissions associated with a transmission from UE 115-*d* based on the resource reservation information of UE 115-*d* received via the broadcast from UE 115-*f*.

In some cases, such feedback may have ramifications on resource reservation or resource usage (e.g., as UE 115-*d* may transmit a retransmission based on the negative acknowledgment), which may be identifiable or predictable by UE 115-*g*. In general, such control forwarding techniques may provide context to otherwise seemingly miscellaneous feedback transmissions when feedback transmissions may be in response to a transmitting UE (e.g., UE 115-*d*) in NLOS from the UE (e.g., UE 115-*g*) receiving the feedback transmission. Using forwarded control information, UE 115-*g* may thus identify context of such received feedback, and may identify resource reservation and resource usage ramifications associated with such received feedback (e.g., such as additional resources to be used for retransmissions by UE 115-*d* in response to negative feedback broadcast by UE 115-*e*). For example, UE 115-*g* may refrain from using certain resources associated with retransmissions (e.g., which may be included or indicated by resource reservation information of UE 115-*d* including in the broadcast from UE 115-*f*) if the UE 115-*g* identifies negative feedback. Conversely, if UE 115-*g* receives feedback from UE 115-*e* indicative of a successful transmission from UE 115-*d*, UE 115-*g* may acknowledge the feedback as a clear-to-send (CTS) (e.g., as a CTS associated with released retransmission resources corresponding to the acknowledgement from UE 115-*e* and/or UE 115-*f*).

In some aspects, network coding may be employed to improve control forwarding efficiency. For example, each set of resource reservation information (e.g., resource reservation information corresponding to each UE 115) may be viewed as a packet. Multiple packets (e.g., sets of resource reservation information) may be combined, using linear addition in a large field (for example GF 128 field, etc.), into an encoded packet (e.g., into a large field with each other to create a coded packet). A data packet broadcast by a UE 115 may include as many coded packets as possible based on the additional resources available to the broadcaster (e.g., based on the additional resources in the transmission interval, or TTI, considering the amount of resources in the transmission interval and the amount of resources associated with resource reservation information of the broadcaster). At the receiver side (e.g., at a UE 115 receiving the broadcast), by virtue of reservation schemes, some of the packets (e.g., the reserved resource information sets associated with certain UEs 115) may have already been received.

The receiver may thus follow a decoding procedure to determine or decode any new or previously unknown (e.g., any not yet received) reservation information from the received coded reservation information (e.g., based on known or originally received reservation information). In cases where the coded reservation information is formed via linear combining, the receiver may use, for example, a Gaussian elimination decoding process or any other linear equation solving technique. For example, the receiver may use Gaussian elimination on the large field to recover any un-received packets (e.g., which may include reserved resource information sets associated with one or more UE 115 in NLOS with respect to the receiving UE). Multiple coded packets from multiple transmitting UEs may be used in such a Gaussian elimination process.

For example, UE 115-*f* may combine packets (e.g., resource reservation information sets) associated with UE 115-*d* and UE 115-*e*, and may linearly combine the packets into a coded packet (e.g., in a large field). The UE 115-*f* may then broadcast the data packet (e.g., the coded packet including the sets of reserved resource information) during a transmission interval. UE 115-*g* may receive the transmission, and use Gaussian elimination to recover the set of resource reservation information associated with the UE 115-*d* (e.g., as UE 115-*g* may have already received the set of resource reservation information associated with UE 115-*e* in a previous control information transmission or data packet broadcast by UE 115-*e*). Generally, a UE 115 receiving a transmission with resource reservation information (e.g., such as a sidelink control information transmission) may decode the transmission based on how the resource reservation information is formed, combined, encoded, etc. (e.g., such as based on whether the resource reservation information is combined linearly by a transmitting UE 115).

As discussed above, a resource reservation information set associated with a UE may include a starting TTI associated with the UE's transmission resource reservation, an ending TTI associated with the UE's transmission resource reservation, a duration (e.g., a resource reservation period) or frequency range of the UE's transmission resource reservation, a priority of the UE, a location of the UE, a transmitter side protection parameter of the UE, a receiver side protection parameter of the UE, or some combination thereof. For example, UEs 115 may exchange sidelink control information to convey resource reservation information for scheduling of physical sidelink shared channel transmissions (e.g., which in some cases may include data, additional control information, such as second stage sidelink control information, etc. on the physical sidelink shared channel).

That is, UEs 115 may exchange transmissions where reservation information may be transmitted at the same time (e.g., or in a same transmission) as data packets. For example, reservation information may be conveyed via sidelink control information, MAC control elements (CEs), etc., which may be transmitted at the same time (or as part of a same transmission) as data information or a data packet. In some cases, a sidelink control information format may include a resource reservation period field, a priority field, etc. (e.g., where each filed encodes information to convey the resource reservation information in a format interpretable by a receiving UE 115). As such, a UE 115 receiving such a sidelink control information format in a slot may (e.g., based on the format) determine the sidelink control information format corresponds to a resource reservation signal, determine priority of various resource reservations (e.g., of communications or UEs 115 associated with resource reservations), may determine durations and/or frequency ranges associated with resource reservation periods, etc.

In cases of emergency information, low latency information, etc. where two UEs 115 may wish to contend for the same resource, UEs 115 may yield to the UE with a higher priority (e.g., as indicated in resource reservation information). A transmitter side protection parameter may include a distance threshold, a RSRP threshold, etc., and may refer to a parameter that may indicate to other UEs criteria that may allow the other UEs to determine whether or not they may use a resource indicated as reserved. For example, a transmitter side protection parameter may indicate distance information needed for protection from interference. A receiving UE may use the transmitter side protection parameter and an estimated distance from the UE reserving a resource to determine whether or not to apply (e.g., or adhere to) the reserved resource (e.g., if a transmitter side protection parameter indicates 500 m, a UE 700 m away may in some cases use the reserved resource). As another example, a receiving UE may receive a transmitter side protection parameter indicating an RSRP threshold, and may identify RSRP of a negative feedback transmission from another UE, and may determine whether the receiving UE may use the resource (e.g., transmit) or whether utilization of the resource may result in ruining RSRP thresholds from the perspective of the UE transmitting the feedback.

Figure 4:
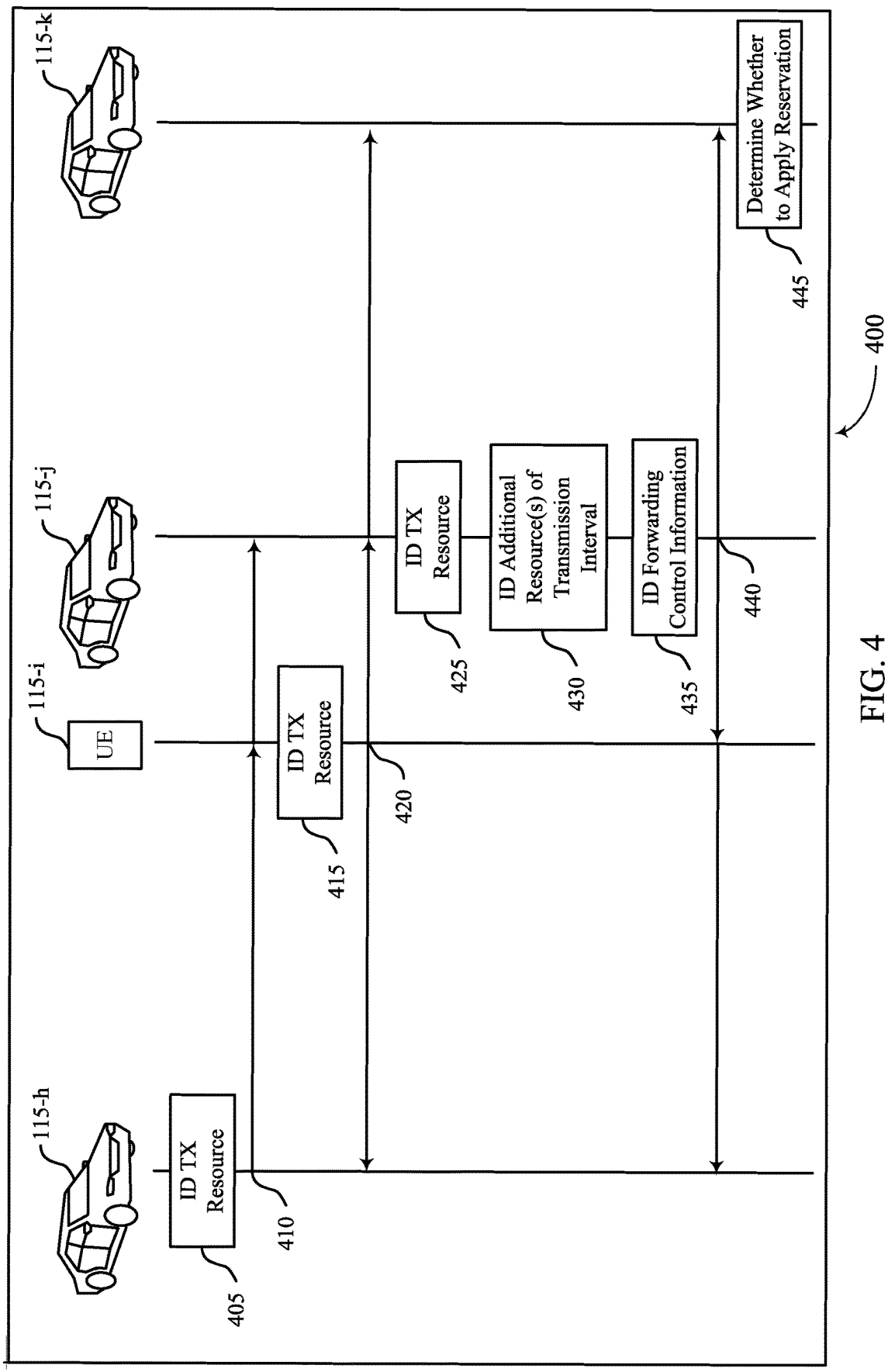
FIG. 4 illustrates an example of a process flow that supports control forwarding techniques for wireless communications in accordance with one or more aspects of the present disclosure.

FIG. 4 illustrates an example of a process flow 400 that supports control forwarding techniques for wireless communications in accordance with one or more aspects of the present disclosure. In some examples, process flow 400 may implement aspects of wireless communications system 100, wireless communications system 200, and sidelink communications system 300. Process flow 400 illustrates aspects of techniques performed by UEs 115-*h*, 115-*i*, 115-*j*, and 115-*k*, which may be an example of a UE 115 described with reference to FIGS. 1-3. In the following description of the process flow 400, the operations between the UEs 115-*h*, 115-*i*, 115-*j*, and 115-*k* may be transmitted in a different order than the exemplary order shown, or the operations performed by UEs 115-*h*, 115-*i*, 115-*j*, and 115-*k* may be performed in different orders or at different times. In some cases, certain operations may also be left out of the process flow 400, or other operations may be added to the process flow 400.

At 405, UE 115-*h* may determine (e.g., select based on availability) a first transmission resource to be reserved for transmission by the UE 115-*h*.

At 410, UE 115-*h* may broadcast or otherwise signal reservation of the first transmission resource. For example, UE 115-*h* may broadcast control information or an RRS including a first set of resource reservation information (e.g., resource reservation information associated with the UE 115-*h*), during a transmission interval. The transmission interval may be some smallest resource granularity unit, or may be some integer multiple of a smallest resource granularity unit. In the example of process flow 400, UE 115-*i* and UE 115-*j* may receive the reservation of the first transmission resource (e.g., the set of resource reservation information associated with UE 115-*h*), and UE 115-*k* may not receive the reservation of the first transmission resource (e.g., as UE 115-*k* may be in a NLOS situation relative to UE 115-*h*). As such, UE 115-*i* and UE 115-*j* may update their respective resource maps based on the set of resource reservation information associated with UE 115-*h*.

At 415, UE 115-*i* may determine (e.g., select) a second transmission resource to be reserved for transmission by the UE 115-*i*. In some cases, the UE 115-*i* may identify the second transmission resource based on a stored resource map (e.g., which may include at least the reservation of the first transmission resource by UE 115-*h*).

At 420, UE 115-*i* may broadcast or otherwise signal reservation of the second transmission resource. For example, UE 115-*i* may broadcast control information or an RRS including a second set of resource reservation information (e.g., resource reservation information associated with the UE 115-*i*), during a transmission interval. The transmission interval may be some smallest resource granularity unit, or may be some integer multiple of a smallest resource granularity unit. In the example of process flow 400, UE 115-*h*, UE 115-*j*, and UE 115-*k* may be positioned in LOS relative to UE 115-*i*, and may receive the reservation of the second transmission resource (e.g., the set of resource reservation information associated with UE 115-*i*). As such, UE 115-*h*, UE 115-*j*, and UE 115-*k* may update their respective resource maps based on the set of resource reservation information associated with UE 115-*i*.

At 425, UE 115-*j* may identify a third transmission resource to be selected for transmission by the UE 115-*j*. In some cases, the UE 115-*j* may identify the third transmission resource based on a stored resource map (e.g., which may include at least the reservation of the first transmission resource by UE 115-*h* and the second transmission resource by UE 115-*i*). For example, UE 115-*j* may identify an available resource, considering the first transmission resource and second transmission resource reserved by UE 115-*h* and UE 115-*i*, via its resource map. For example, UE 115-*j* may determine that the first and second transmission resources (e.g., at 405 and 415) are reserved by UE 115-*h* and UE 115-*i* via respective sets of resource reservation information that may be received via piggybacked resource reservation information from UE 115-*i* (e.g., at 420).

At 430, UE 115-*j* may identify additional resources of a transmission interval for broadcasting the reserved resource information of the UE 115-*j* (e.g., the reservation of the third transmission resource). The transmission interval may be some smallest resource granularity unit, or may be some integer multiple of a smallest resource granularity unit. The UE 115-*j* may thus identify that the transmission interval includes a first set of resources for transmission of the set of resource reservation information associated with UE 115-*j*. The UE 115-*j* may then identify additional resources (e.g., available padding bits) of the transmission interval based on the first set of resources (e.g., for reservation of the third transmission resource) and the amount of resources of the transmission interval (e.g., the additional resources may be determined from calculating the remaining resources after subtracting the first set of resources from the transmission interval total amount of resources).

At 435, UE 115-*j* may identify control information to be forwarded via the additional resources. For example, the UE 115-*j* may identify other resource reservation information sets to include with its own resource reservation information, based on the amount of additional resources. In other words, UE 115-*j* may determine one or more other transmission resources (e.g., the first transmission resource and the second transmission resource) that are reserved by one or more other wireless devices (e.g., UE 115-*h* and UE 115-*i*) via respective other sets of resource reservation information (e.g., received at 410 and 420, respectively). In some cases, the control information to be forwarded may be selected based on a priority of the sets of the reserved resource information.

For example, in some cases, from the sets of reserved resource information received at 410 and 420, UE 115-*j* may identify a priority of the UEs 115-*h* and 115-*i* and prioritize and forward the set of reserved resource information associated with the higher priority UE. In other examples, the UE 115-*j* may identify a potential hidden node scenario (e.g., or NLOS situation) based on distance or position information included in the received sets of resource reservation information, and may prioritize and forward the set of reserved resource information associated with a potentially hidden node from the perspective of a UE the UE 115-$j$ expects to receive the broadcast. That is, UE 115-$j$ may identify UE 115-$h$ may potentially be a hidden node from the perspective of UE 115-$k$ (e.g., based on distance information, position information, previously identified interference or collisions arising from UEs 115-$h$ and 115-$k$, known mapping of the environment or road from GPS information, or some combination thereof), and may prioritize the set of resource reservation information associated with UE 115-$h$, as the UE 115-$j$ may expect UE 115-$k$ is able to receive the broadcast, and thus identify resource reservation information associated with UE 115-$h$ that the UE 115-$k$ may not otherwise be able to receive. In yet other examples, the priority may be based on RSRP parameters associated with the resource reservation information of the other UEs 115.

The UE 115-$j$ may forward (e.g., include in the broadcast at 440) as many of the sets of resource reservation information as will fit within the additional resources, based at least in part on (e.g., selected in order of) the priority. In some cases, the UE 115-$j$ may aggregate respective second sets of resource reservation information to be included in the additional resources of the transmission interval to be broadcast at 440. In some cases, UE 115-$j$ may use linear addition to combine at least some of the second (e.g., other) sets of resource reservation information into a coded packet, and include as many coded packets as can fit within the additional resources.

At 440, UE 115-$j$ may broadcast or otherwise signal reservation of the third transmission resource (e.g., as well as the first and/or second transmission resource). For example, UE 115-$j$ may broadcast control information or an RRS including a resource reservation information associated with the UE 115-$j$, during the first set of resources, and one or more other sets of resource reservation information during the additional resources. In the example of process flow 400, UE 115-$h$, UE 115-$j$, and UE 115-$k$ may be positioned in LOS relative to UE 115-$i$, and may receive the reservation of the second transmission resource (e.g., the set of resource reservation information associated with UE 115-$j$, as well as the one or more sets of resource reservation information associated with UE 115-$h$ and/or UE 115-$i$). As such, UE 115-$h$, UE 115-$i$, and UE 115-$k$ may update their respective resource maps accordingly. Specifically, UE 115-$k$ may update its resource map based on resource reservation information associated with UE 115-$h$, as UE 115-$k$ may not have previously received the resource reservation information associated with UE 115-$h$, when it was broadcast by UE 115-$h$.

At 445, UE 115-$h$ may determine whether the transmission resource reservation of the one or more additional wireless devices (e.g., the resource reservation information of UE 115-$h$, UE 115-$i$, and UE 115-$j$, such as the first, second, and third transmission resource reservations) are to be applied (e.g., whether the UE 115-$h$ will refrain from selecting and transmitting using the first, second, and third transmission resource reservations, or whether any of the first, second, and third transmission resource reservations may be used by the UE 115-$h$). For example, the set of reserved resource information associated with the UE 115-$h$ may include a starting TTI associated with the transmission resource reservation of the UE 115-$h$, an ending TTI associated with the UE 115-$h$, a priority of the UE 115-$h$, a location of the UE 115-$h$, a distance of the UE 115-$h$ from one or more of the other UEs 115, a transmitter side protection parameter associated with the UE 115-$h$, a receiver side protection parameter associated with each of the UE 115-$h$, or some combination thereof.

In some cases, UE 115-$k$ may use Gaussian elimination to recover the set of resource reservation information associated with the transmission resource reservation of UE 115-$h$ (e.g., and in general any resource reservation information that has not already been received by the UE 115-$k$).

Figure 5:
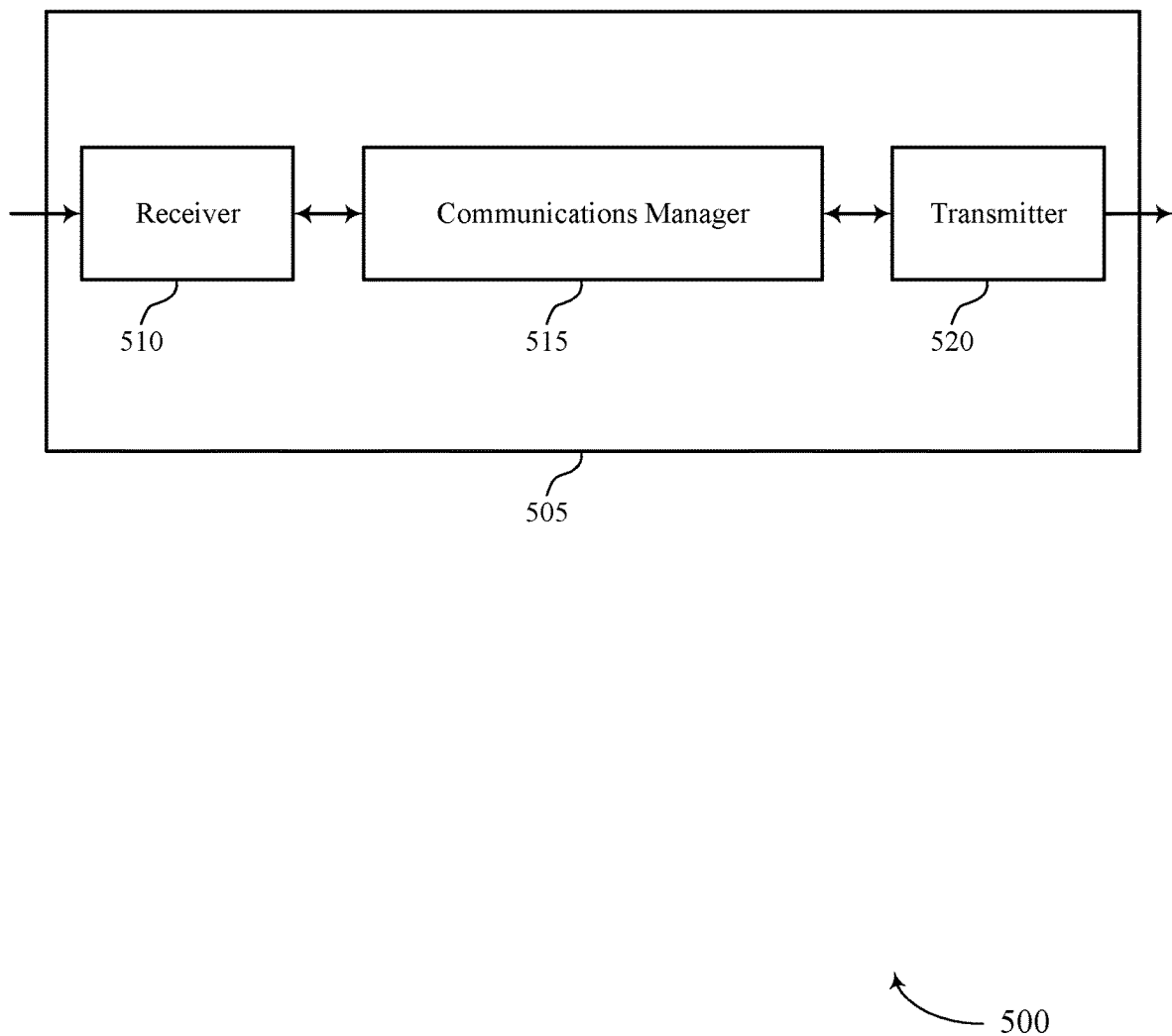
FIGS. 5 and 6 show block diagrams of devices that support control forwarding techniques for wireless communications in accordance with one or more aspects of the present disclosure.

FIG. 5 shows a block diagram 500 of a device 505 that supports control forwarding techniques for wireless communications in accordance with one or more aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to control forwarding techniques for wireless communications, etc.). Information may be passed on to other components of the device 505. The receiver 510 may be an example of aspects of the transceiver 820 described with reference to FIG. 8. The receiver 510 may utilize a single antenna or a set of antennas.

In some examples, a first wireless device (e.g., a transmitting device, a broadcasting device, a device reserving resources, a device forwarding resources reserved by other devices, etc.) may include a communications manager 515, and the communications manager 515 may select a first transmission resource to be reserved for transmission by the first wireless device and to be included in a first set of resource reservation information to be transmitted during a transmission interval. The communications manager 515 may determine one or more second transmission resources that are selected for transmission by one or more second wireless devices via respective second sets of resource reservation information, and transmit a signal during the transmission interval, where the signal includes the first set of resource reservation information during the first set of resources and at least one of the second sets of resource reservation information during additional resources of the transmission interval. For example, communications manager 515 may transmit signals to other wireless devices (e.g., other UEs), where reservation information may be transmitted at the same time (e.g., or in a same transmission or a same signal) as data packets. For example, reservation information may be conveyed via sidelink control information and MAC CEs, which may be transmitted at the same time as data packet.

In some examples, a first wireless device (e.g., a receiving device, a device receiving reserved resource information, etc.) may include a communications manager 515, and the communications manager 515 may receive a signal from a second wireless device, where the signal includes a first set of resource reservation information associated with one or more transmission resource reservations of the second wireless device and a second set of resource reservation information associated with one or more transmission resource reservations of one or more additional wireless devices. The communications manager 515 may determine whether the transmission resource reservation of the one or more additional wireless devices is to be excluded for use by the first wireless device. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
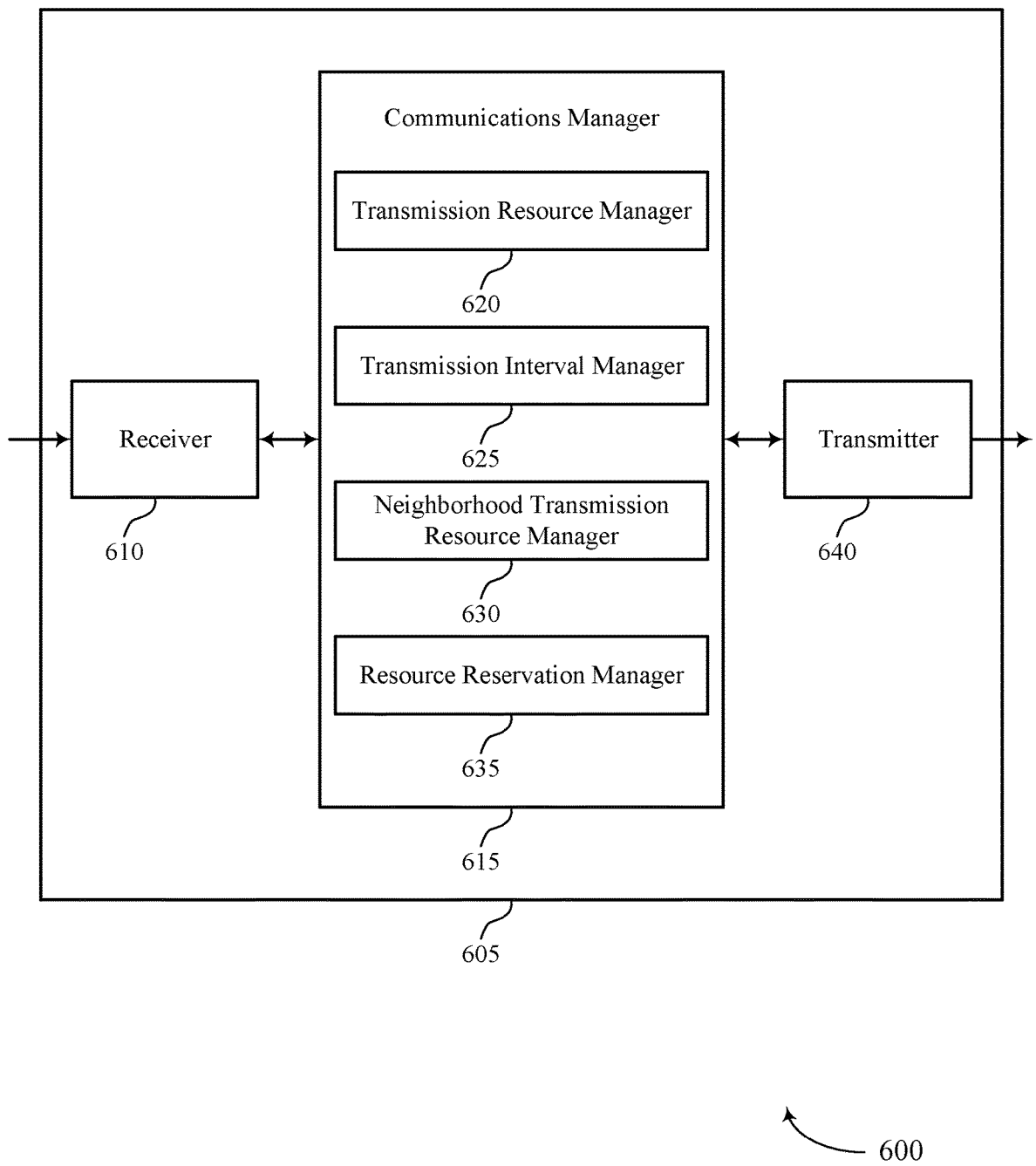

FIG. 6 shows a block diagram 600 of a device 605 that supports control forwarding techniques for wireless communications in accordance with one or more aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to control forwarding techniques for wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a transmission resource manager 620, a transmission interval manager 625, a neighborhood transmission resource manager 630, and an autonomous resource selection manager 635. The communications manager 615 may be an example of aspects of the communications manager 810 described herein.

In some examples, a first wireless device (e.g., a transmitting device, a broadcasting device, a device reserving resources, a device forwarding resources reserved by other devices, etc.) may include a transmission resource manager 620 and a neighborhood transmission resource manager 630. The transmission resource manager 620 may select a first transmission resource to be selected for transmission by the first wireless device and to be included in a first set of resource reservation information to be transmitted during a transmission interval. The neighborhood transmission resource manager 630 may determine one or more second transmission resources that are selected for transmission by one or more second wireless devices via respective second sets of resource reservation information. The autonomous resource selection manager 635 may transmit a signal during the transmission interval, where the signal includes the first set of resource reservation information during the first set of resources and at least one of the second sets of resource reservation information during additional resources of the transmission interval.

In some examples, a first wireless device (e.g., a receiving device, a device receiving reserved resource information, etc.) may include an autonomous resource selection manager 635. The autonomous resource selection manager 635 may receive a signal from a second wireless device, where the signal includes a first set of resource reservation information associated with one or more transmission resource reservations of the second wireless device and a second set of resource reservation information associated with one or more transmission resource reservations of one or more additional wireless devices. For example, autonomous resource selection manager 635 may receive a signal including sidelink control information, MAC CEs, etc., which may convey reservation information (e.g., the first set of resource reservation information, the second set of resource reservation information, etc.). In some cases, the signal may also include other information such as a data packet. The autonomous resource selection manager 635 may determine whether the transmission resource reservation of the one or more additional wireless devices is to be excluded for use by the first wireless device.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
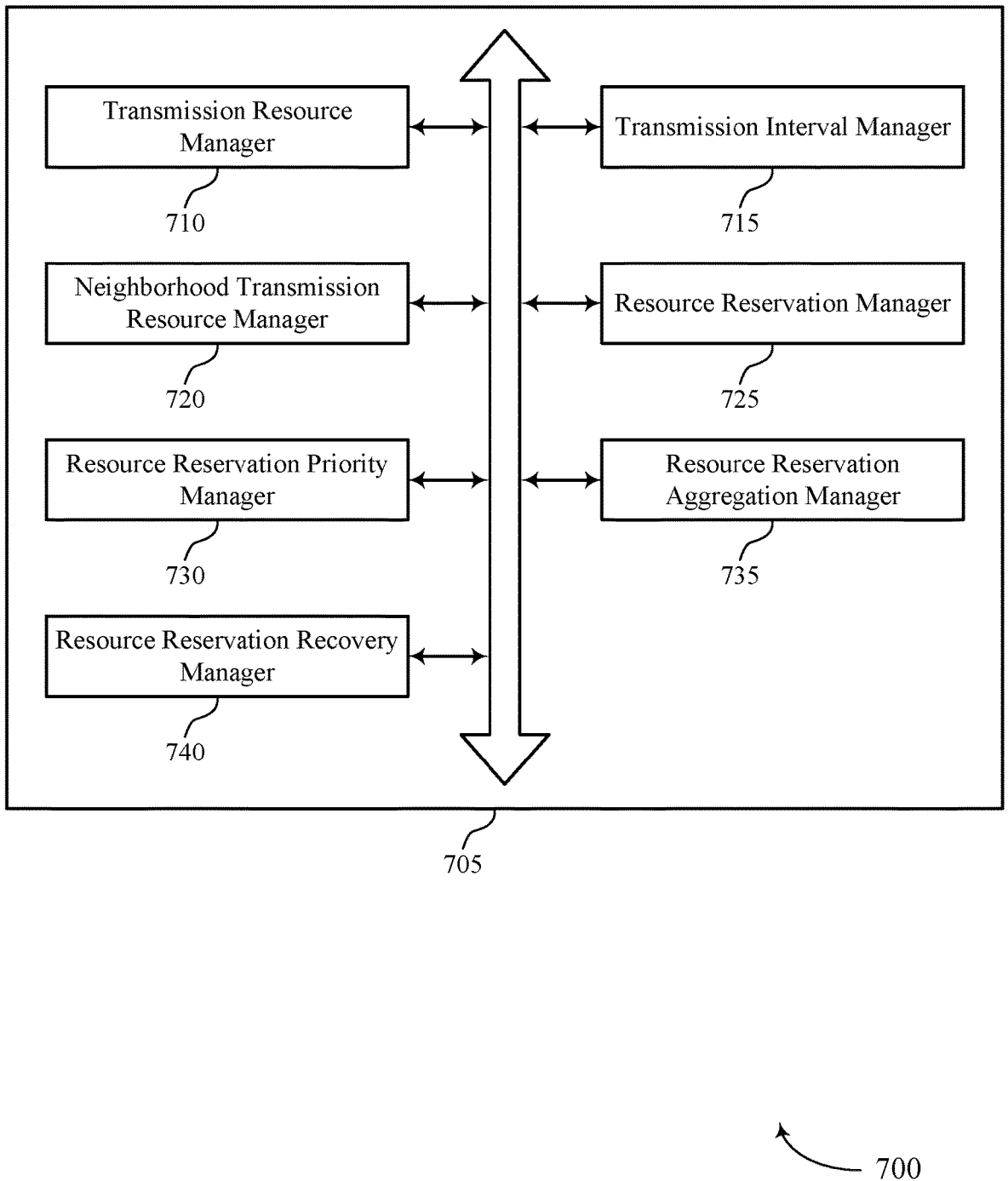
FIG. 7 shows a block diagram of a communications manager that supports control forwarding techniques for wireless communications in accordance with one or more aspects of the present disclosure.

FIG. 7 shows a block diagram 700 of a communications manager 705 that supports control forwarding techniques for wireless communications in accordance with one or more aspects of the present disclosure. The communications manager 705 may be an example of aspects of a communications manager 515, a communications manager 615, or a communications manager 810 described herein. The communications manager 705 may include a transmission resource manager 710, a transmission interval manager 715, a neighborhood transmission resource manager 720, an autonomous resource selection manager 725, a resource reservation priority manager 730, a resource reservation aggregation manager 735, and a resource reservation recovery manager 740. Each of these modules may communicate, directly or indirectly, with one another (e.g., via one or more buses).

In some examples, a first wireless device (e.g., a transmitting device, a broadcasting device, a device reserving resources, a device forwarding resources reserved by other devices, etc.) may include a transmission resource manager 710, neighborhood transmission resource manager 720, and an autonomous resource selection manager 725. The transmission resource manager 710 may select a first transmission resource to be selected for transmission by the first wireless device and to be included in a first set of resource reservation information to be transmitted during a transmission interval. In some cases, the first set of resource reservation information includes a starting transmission time interval associated with a reserved resource set, an ending transmission time interval associated with the reserved resource set, a priority of the first wireless device, a location information of the first wireless device, a transmitter side protection parameter, a receiver side protection parameter, or some combination thereof. The neighborhood transmission resource manager 720 may determine one or more second transmission resources that are selected for transmission by one or more second wireless devices via respective second sets of resource reservation information. The autonomous resource selection manager 725 may transmit a signal during the transmission interval, where the signal includes the first set of resource reservation information during the first set of resources and at least one of the second sets of resource reservation information during additional resources of the transmission interval.

The resource reservation priority manager 730 may determine a priority associated with reservation of the one or more second transmission resources by the one or more second wireless devices, where the at least one of the second set of resource reservation information is identified based on relative priorities. In some cases, the priority is based on a distance between the first wireless device and each of the one or more second wireless devices. In some cases, the priority is based on one or more RSRP parameters associated with the second sets of resource reservation information. In some cases, the at least one of the second set of resource reservation information included within the additional resources includes as many of the second set of resource reservation information as will fit within the additional resources, based on the priority.

The resource reservation aggregation manager 735 may aggregate respective second sets of resource reservation information to be included in the additional resources. In some examples, the resource reservation aggregation manager 735 may use linear addition to combine at least some of the second sets of resource reservation information into a coded packet. In some examples, the resource reservation aggregation manager 735 may include as many coded packets as can fit within the additional resources.

In some cases, at least one of the first set of resource reservation information or the second set of resource reservation information includes a starting transmission time interval associated with the transmission resource reservation of the second wireless device, an ending transmission time interval associated with the transmission resource reservation of the second wireless device, a number of subchannels and a starting subchannel, a priority of the first wireless device or the second wireless device, a location information of the first wireless device or the second wireless device, a transmitter side protection parameter associated with the second wireless device, a receiver side protection parameter associated with the second wireless device, or some combination thereof.

In some cases, the autonomous resource selection manager 725 may determine to forward the one or more second transmission resources that are reserved by one or more second wireless devices based on a location of the first wireless device, a location of the one or more second wireless devices, a location of a receiving device, a network configuration, or some combination thereof, where the signal is transmitted to the receiving device based on the determination to forward the one or more second transmission resources.

In some examples, a first wireless device (e.g., a receiving device, a device receiving reserved resource information, etc.) may include an autonomous resource selection manager 725. The autonomous resource selection manager 725 may receive a signal from a second wireless device, where the signal includes a first set of resource reservation information associated with one or more transmission resource reservations of the second wireless device and a second set of resource reservation information associated with one or more transmission resource reservations of one or more additional wireless devices. The autonomous resource selection manager 725 may determine whether the transmission resource reservation of the one or more additional wireless devices is to be excluded for use by the first wireless device.

In some examples, the autonomous resource selection manager 725 may refrain from transmitting during the transmission resource reservation of the one or more additional wireless devices based on at least one of the priority of the one or more wireless devices, or the distance or RSRP included in a protection parameter. In some examples, the autonomous resource selection manager 725 may refrain from transmitting during the transmission resource reservation of the one or more additional wireless devices based on the receiver side protection parameter associated with the second wireless device, a RSRP associated with the second wireless device, a distance between the first wireless device and the second wireless device, and feedback received pertaining to communications with the second wireless device.

In some cases, the protection parameters may include a distance, a RSRP, or some combination thereof. In some cases, at least one of the first set of resource reservation information or the second set of resource reservation information includes a starting transmission time interval associated with the transmission resource reservation of the one or more additional wireless devices, an ending transmission time interval associated with the one or more additional wireless devices, a number of subchannels and a starting subchannel, a priority of the first wireless device or of the second wireless device or of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

In some cases, as discussed herein, resource reservation recovery manager 740 may follow a decoding procedure to determine or decode any new or previously unknown (e.g., any not yet received) resource reservation information from the received transmission (e.g., based on known or previously received resource reservation information). In cases where the signal (e.g., the coded first set of resource reservation information, the coded second set of resource reservation information, etc.) is formed via linear combining, resource reservation recovery manager 740 may use Gaussian elimination or any other linear equation solving technique. For example, the resource reservation recovery manager 740 may use Gaussian elimination to recover the second set of resource reservation information associated with the transmission resource reservation of the one or more additional wireless devices that has not already been received at the first wireless device.

Figure 8:
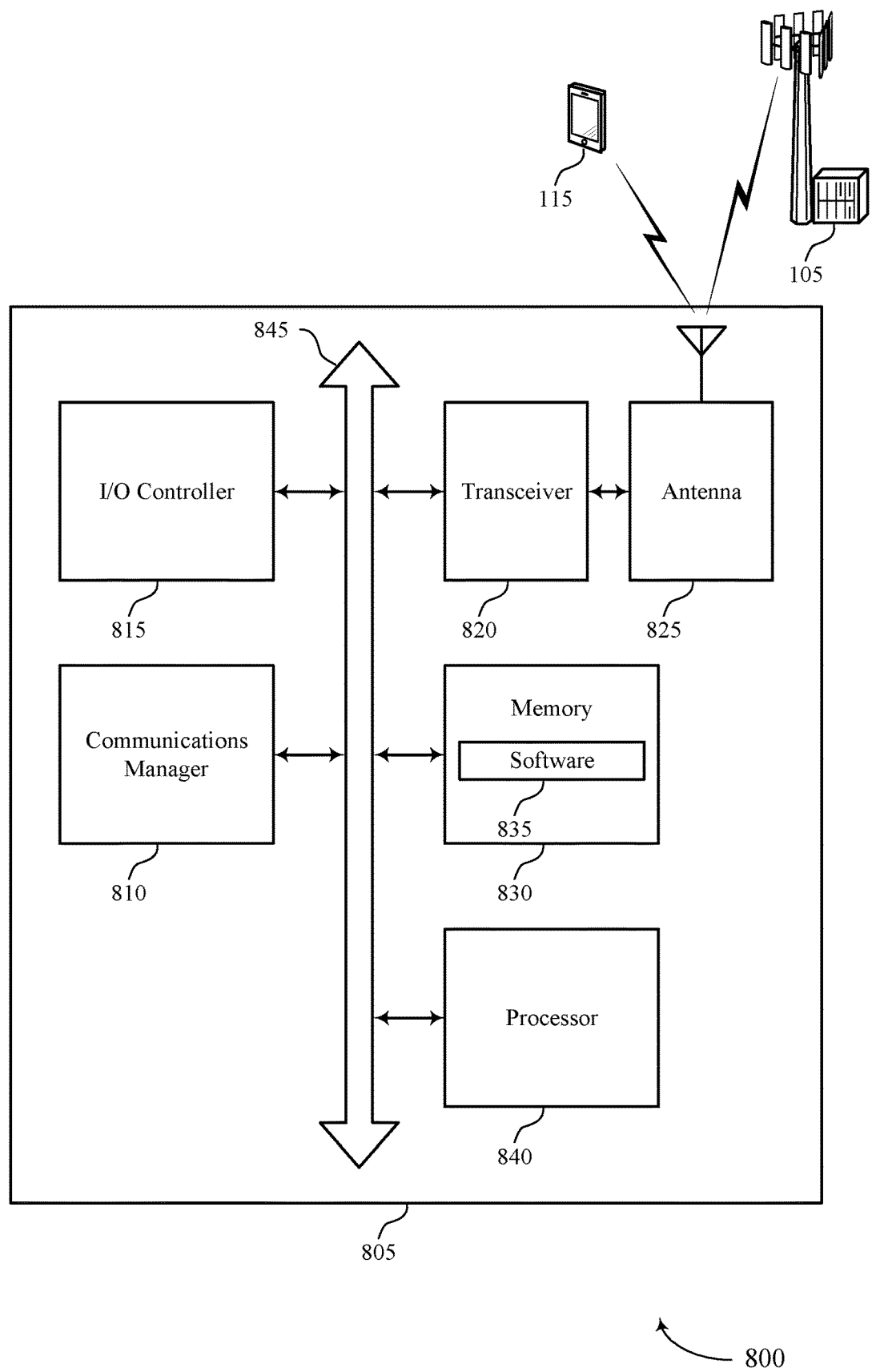
FIG. 8 shows a diagram of a system including a device that supports control forwarding techniques for wireless communications in accordance with one or more aspects of the present disclosure.

FIG. 8 shows a diagram of a system 800 including a device 805 that supports control forwarding techniques for wireless communications in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

In some examples, a first wireless device (e.g., a transmitting device, a broadcasting device, a device reserving resources, a device forwarding resources reserved by other devices, etc.) may include a communications manager 810. The communications manager 810 may select a first transmission resource to be selected for transmission by the first wireless device and to be included in a first set of resource reservation information to be transmitted during a transmission interval. The communications manager may determine one or more second transmission resources that are selected for transmission by one or more second wireless devices via respective second sets of resource reservation information, and transmit a signal during the transmission interval, where the signal includes the first set of resource reservation information during the first set of resources and at least one of the second sets of resource reservation information during additional resources of the transmission interval.

In some examples, a first wireless device (e.g., a receiving device, a device receiving reserved resource information, etc.) may include a communications manager 810. The communications manager 810 may receive a signal from a second wireless device, where the signal includes a first set of resource reservation information associated with one or more transmission resource reservations of the second wireless device and a second set of resource reservation information associated with one or more transmission resource reservations of one or more additional wireless devices. The communications manager 810 may determine whether the transmission resource reservation of the one or more additional wireless devices is to be excluded for use by the first wireless device.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code or software 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting control forwarding techniques for wireless communications).

The software 835 may include instructions to implement aspects of the present disclosure, including instructions to support wireless communications. The software 835 may be stored in a non-transitory computer-readable medium such as system memory or other type of memory. In some cases, the software 835 may not be directly executable by the processor 840 but may cause a computer (e.g., when compiled and executed) to perform functions described herein.

Figure 9:
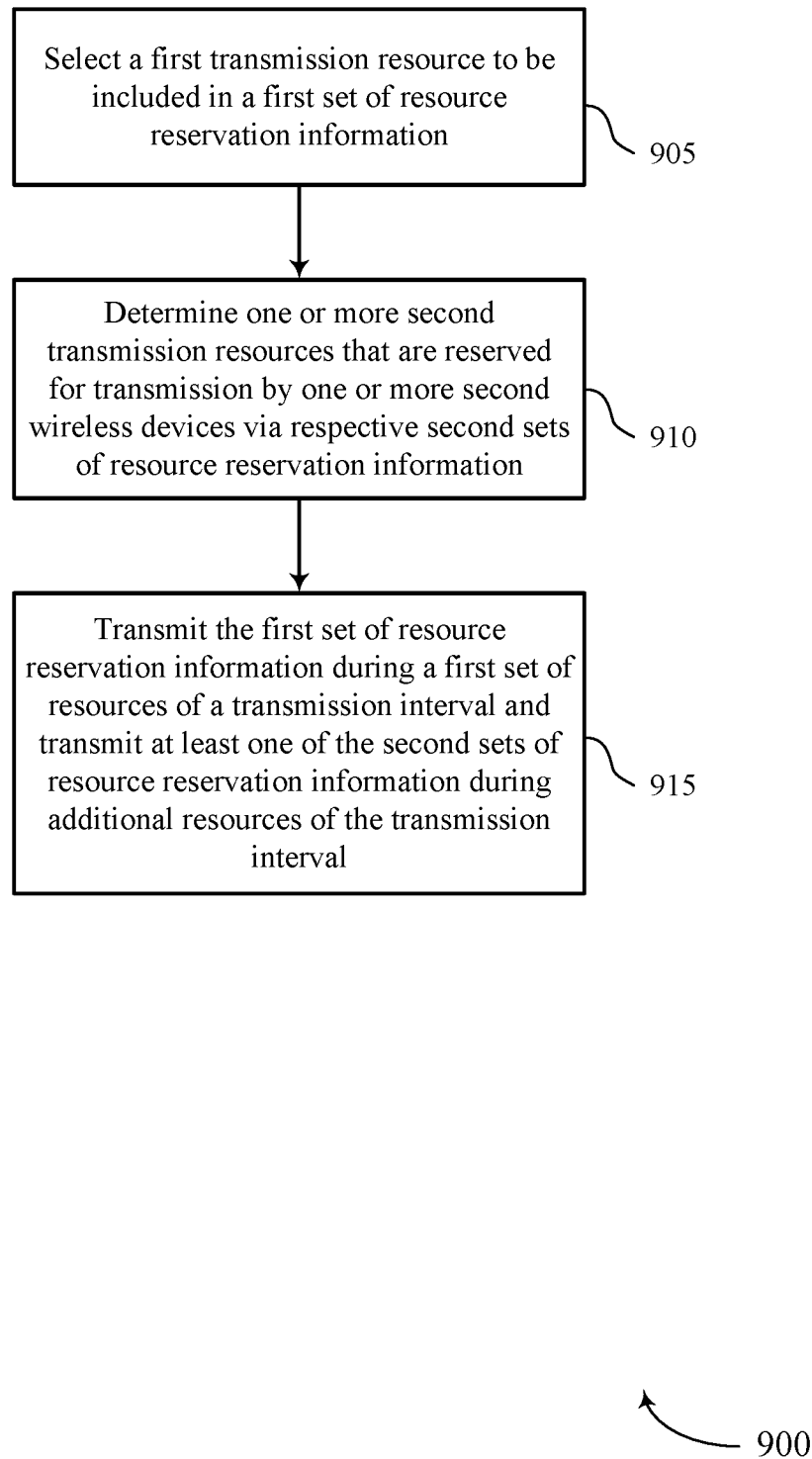
FIGS. 9 through 13 show flowcharts illustrating methods that support control forwarding techniques for wireless communications in accordance with one or more aspects of the present disclosure.

FIG. 9 shows a flowchart illustrating a method 900 that supports control forwarding techniques for wireless communications in accordance with one or more aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE (e.g., a first wireless device) may select a first transmission resource to be selected for transmission by the first wireless device and to be included in a first set of resource reservation information (e.g., the first set of resource reservation information to be transmitted during a transmission interval). The operations of 905 may be performed according to the methods described herein. In some examples, aspects of the operations of 905 may be performed by a transmission resource manager as described with reference to FIGS. 5 through 8.

At 910, the UE may determine one or more second transmission resources that are selected for transmission by one or more second wireless devices via respective second sets of resource reservation information. The operations of 910 may be performed according to the methods described herein. In some examples, aspects of the operations of 910 may be performed by a neighborhood transmission resource manager as described with reference to FIGS. 5 through 8.

At 915, the UE may transmit a signal (e.g., the first set of resource reservation information during the first set of resources and at least one of the second sets of resource reservation information during additional resources of the transmission interval) during the transmission interval. For example, in some cases, the UE may transmit the signal to the first wireless device of FIGS. 12-13. The operations of 915 may be performed according to the methods described herein. In some examples, aspects of the operations of 915 may be performed by an autonomous resource selection manager as described with reference to FIGS. 5 through 8.

Figure 10:
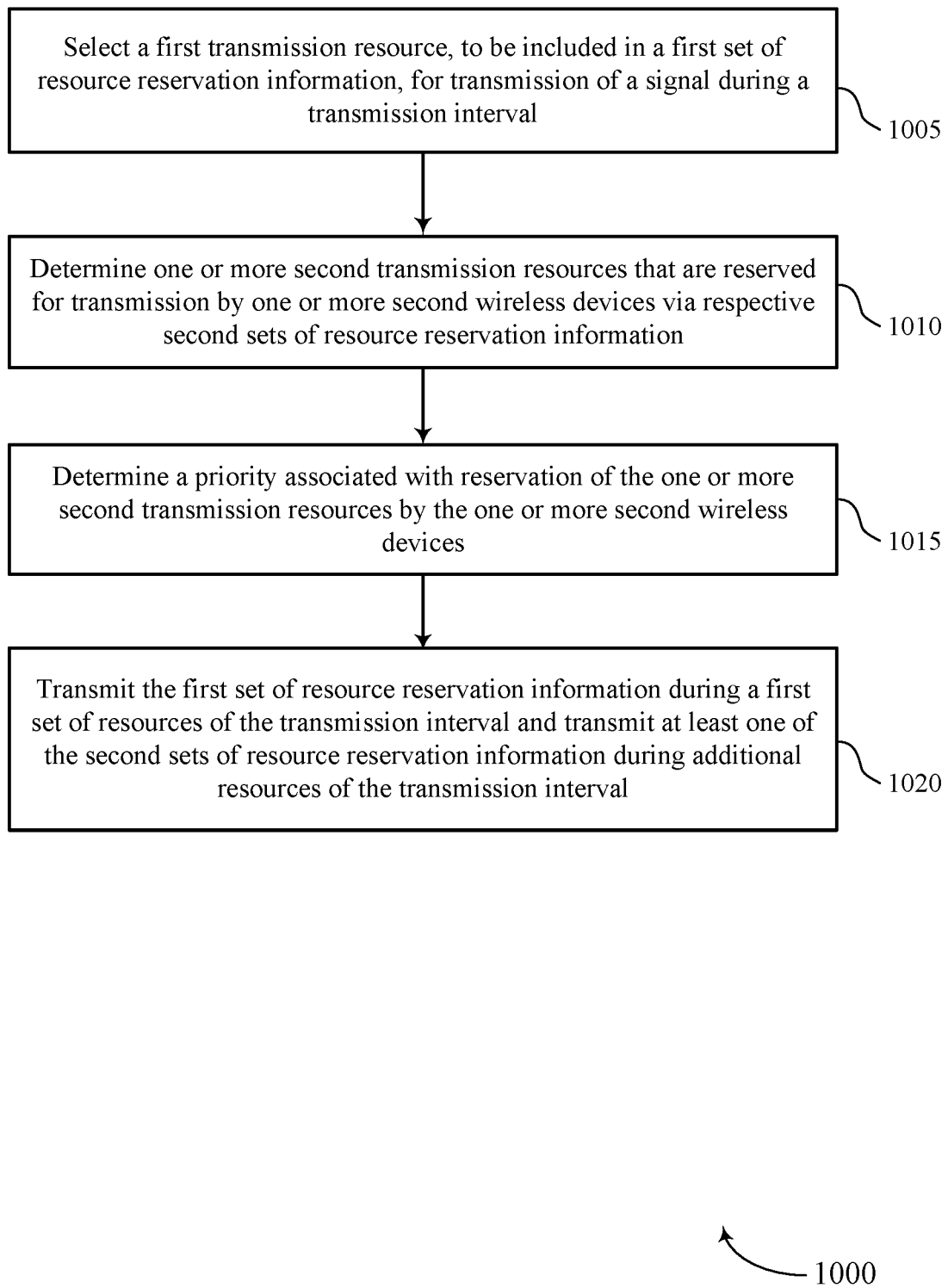

FIG. 10 shows a flowchart illustrating a method 1000 that supports control forwarding techniques for wireless communications in accordance with one or more aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE (e.g., a first wireless device) may select a first transmission resource to be selected for transmission by the first wireless device and to be included in a first set of resource reservation information to be transmitted during a transmission interval. The operations of 1005 may be performed according to the methods described herein. In some examples, aspects of the operations of 1005 may be performed by a transmission resource manager as described with reference to FIGS. 5 through 8.

At 1010, the UE may determine one or more second transmission resources that are reserved by one or more second wireless devices via respective second sets of resource reservation information. The operations of 1010 may be performed according to the methods described herein. In some examples, aspects of the operations of 1010 may be performed by a transmission interval manager as described with reference to FIGS. 5 through 8.

At 1015, the UE may determine a priority associated with reservation of the one or more second transmission resources by the one or more second wireless devices, where the at least one of the second set of resource reservation information is identified based on relative priorities. The operations of 1015 may be performed according to the methods described herein. In some examples, aspects of the operations of 1015 may be performed by a neighborhood transmission resource manager as described with reference to FIGS. 5 through 8.

At 1020, the UE may transmit a signal (e.g., the first set of resource reservation information during the first set of resources and at least one of the second sets of resource reservation information during additional resources of the transmission interval) during the transmission interval. In some cases, the at least one of the second sets of resource reservation information may be included in the signal based on the priority determined at 1015. For example, in some cases, the UE may transmit the signal to the first wireless device of FIGS. 12-13. The operations of 1020 may be performed according to the methods described herein. In some examples, aspects of the operations of 1020 may be performed by an autonomous resource selection manager as described with reference to FIGS. 5 through 8.

Figure 11:
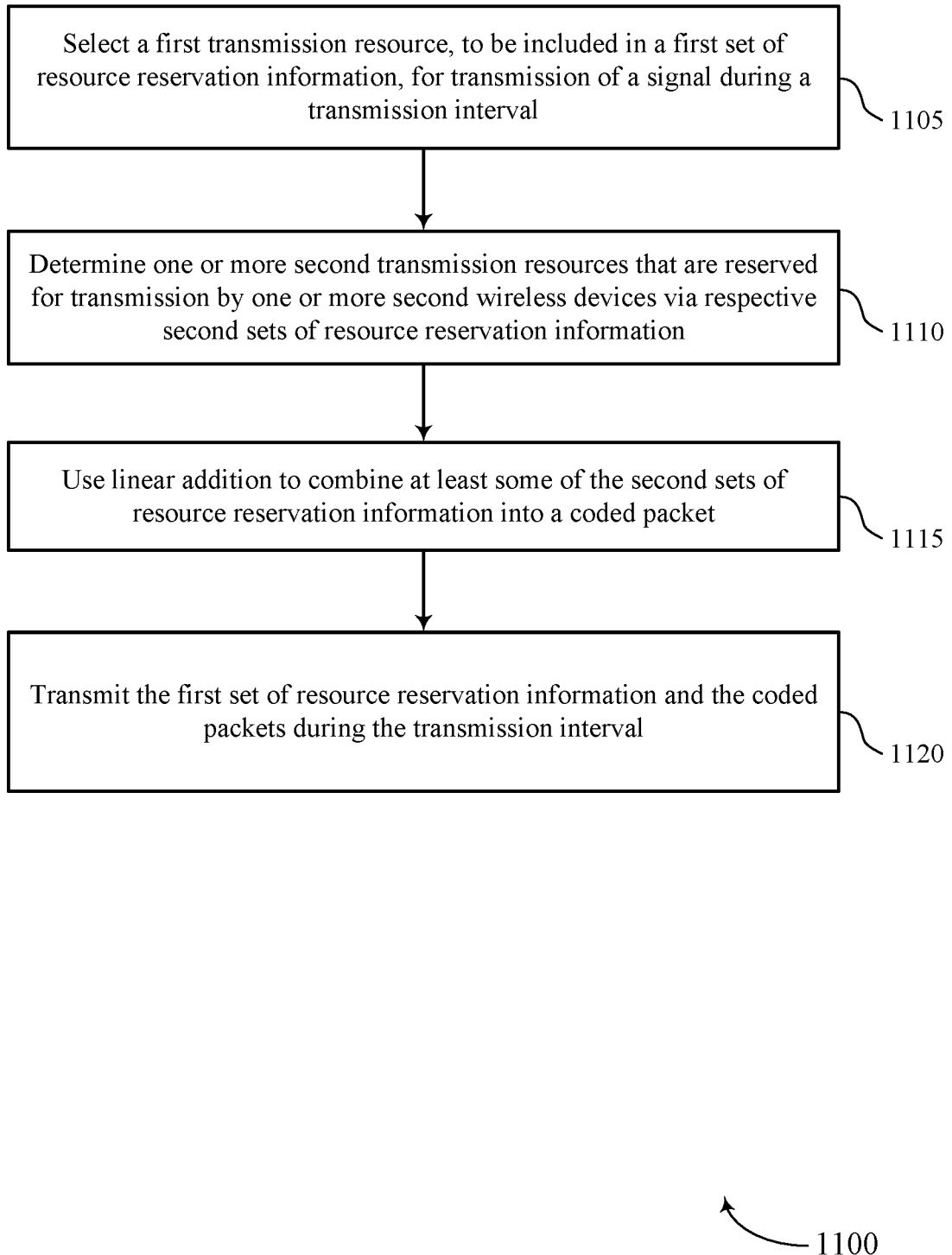

FIG. 11 shows a flowchart illustrating a method 1100 that supports control forwarding techniques for wireless communications in accordance with one or more aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE (e.g., a first wireless device) may select a first transmission resource to be reserved for transmission by the first wireless device to be included in a first set of resource reservation information to be transmitted during a transmission interval. The operations of 1105 may be performed according to the methods described herein. In some examples, aspects of the operations of 1105 may be performed by a transmission resource manager as described with reference to FIGS. 5 through 8.

At 1110, the UE may determine one or more second transmission resources that are reserved by one or more second wireless devices via respective second sets of resource reservation information. The operations of 1110 may be performed according to the methods described herein. In some examples, aspects of the operations of 1110 may be performed by a neighborhood transmission resource manager as described with reference to FIGS. 5 through 8.

At 1115, the UE may use linear addition to combine at least some of the second sets of resource reservation information into a coded packet. In some cases, the UE may include as many coded packets as can fit within the additional resources of the transmission interval. The operations of 1115 may be performed according to the methods described herein. In some examples, aspects of the operations of 1115 may be performed by a resource reservation aggregation manager as described with reference to FIGS. 5 through 8.

At 1120, the UE may transmit a signal (the first set of resource reservation information during the first set of resources and the coded packets) during the transmission interval, where the signal includes the first set of resource reservation information during the first set of resources and at least one of the second sets of resource reservation information during the additional resources of the transmission interval. For example, in some cases, the UE may transmit the signal to the first wireless device of FIGS. 12-13. The operations of 1120 may be performed according to the methods described herein. In some examples, aspects of the operations of 1120 may be performed by an autonomous resource selection manager as described with reference to FIGS. 5 through 8.

Figure 12:
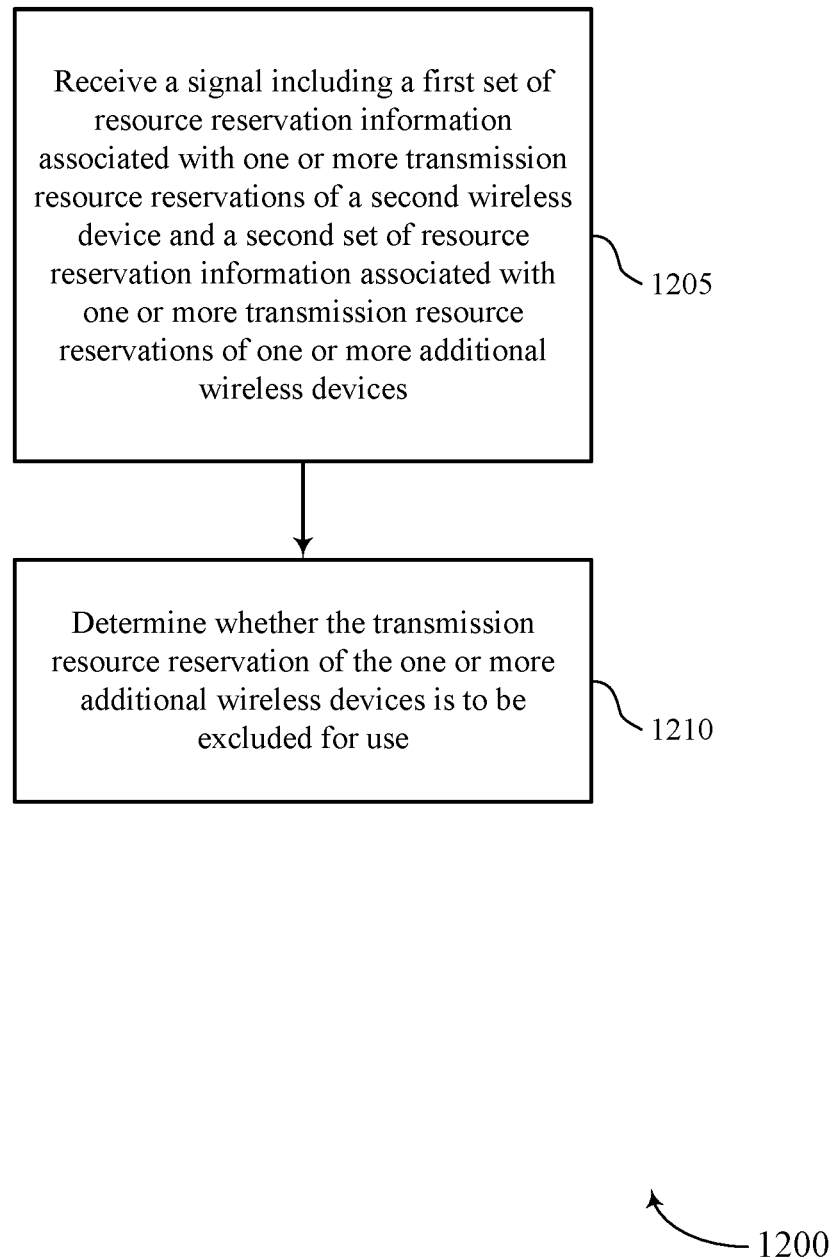

FIG. 12 shows a flowchart illustrating a method 1200 that supports control forwarding techniques for wireless communications in accordance with one or more aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE (e.g., a first wireless device) may receive (e.g., from a second device, for example, such as the first wireless device of FIGS. 9-11) a signal from including a first set of resource reservation information associated with one or more transmission resource reservations of the second wireless device and a second set of resource reservation information associated with one or more transmission resource reservations of one or more additional wireless devices. The operations of 1205 may be performed according to the methods described herein. In some examples, aspects of the operations of 1205 may be performed by an autonomous resource selection manager as described with reference to FIGS. 5 through 8.

At 1210, the UE may determine whether the transmission resource reservation of the one or more additional wireless devices is to be excluded for use by the first wireless device. The operations of 1210 may be performed according to the methods described herein. In some examples, aspects of the operations of 1210 may be performed by an autonomous resource selection manager as described with reference to FIGS. 5 through 8.

Figure 13:
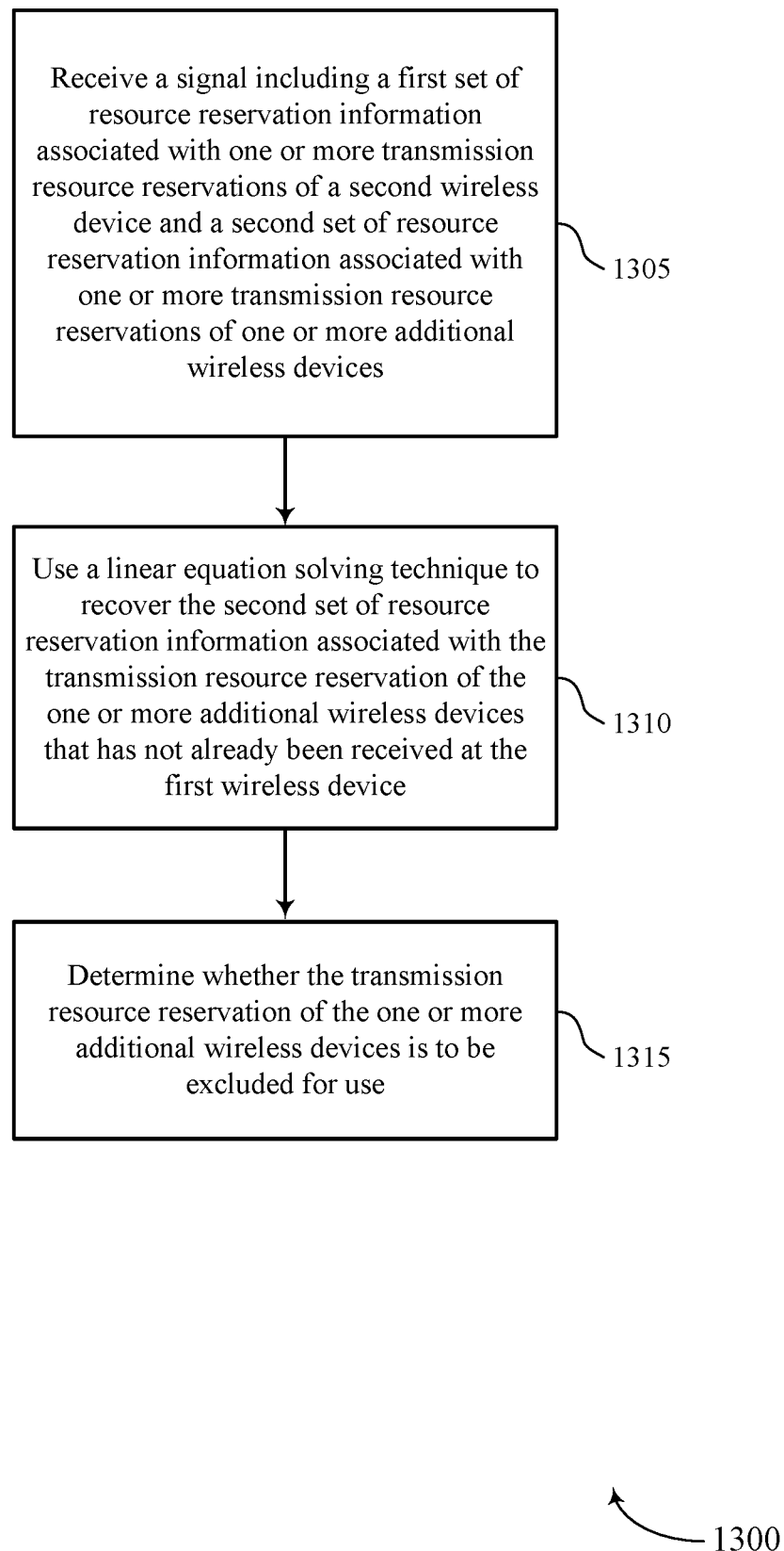

FIG. 13 shows a flowchart illustrating a method 1300 that supports control forwarding techniques for wireless communications in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE (e.g., a first wireless device) may receive (e.g., from a second wireless device, for example, such as the first wireless device of FIGS. 9-11) a signal including a first set of resource reservation information associated with one or more transmission resource reservations of the second wireless device and a second set of resource reservation information associated with one or more transmission resource reservations of one or more additional wireless devices. The operations of 1305 may be performed according to the methods described herein. In some examples, aspects of the operations of 1305 may be performed by an autonomous resource selection manager as described with reference to FIGS. 5 through 8.

At 1310, the UE may use a linear equation solving technique (e.g., Gaussian elimination) to recover the second set of resource reservation information associated with the transmission resource reservation of the one or more additional wireless devices that has not already been received at the first wireless device (e.g., based on the formation, encoding, combining, etc. of the resource reservation information of the signal). The operations of 1310 may be performed according to the methods described herein. In some examples, aspects of the operations of 1310 may be performed by a resource reservation recovery manager as described with reference to FIGS. 5 through 8.

At 1315, the UE may determine whether the transmission resource reservation of the one or more additional wireless devices is to be excluded for use by the first wireless device. The operations of 1315 may be performed according to the methods described herein. In some examples, aspects of the operations of 1315 may be performed by an autonomous resource selection manager as described with reference to FIGS. 5 through 8.

Example 1

A method for wireless communications, comprising: selecting, by a first wireless device, a first transmission resource for transmission by the first wireless device and to be included in a first set of resource reservation information to be transmitted during a transmission interval; determining one or more second transmission resources that are reserved by one or more second wireless devices via respective second sets of resource reservation information; and transmitting a signal during the transmission interval, wherein the signal includes the first set of resource reservation information during the first set of resources and at least one of the second sets of resource reservation information during additional resources of the transmission interval.

Example 2

The method of example 1, further comprising: determining a priority associated with reservation of the one or more second transmission resources by the one or more second wireless devices, wherein the at least one of the second sets of resource reservation information is identified based at least in part on relative priorities.

Example 3

The method of any of examples 1 to 2, wherein the priority is based at least in part on a distance between the first wireless device and each of the one or more second wireless devices.

Example 4

The method of any of examples 1 to 3, wherein the priority is based at least in part on one or more RSRP parameters associated with the second sets of resource reservation information.

Example 5

The method of any of examples 1 to 4, wherein the at least one of the second sets of resource reservation information included within the additional resources includes as many of the second sets of resource reservation information as will fit within the additional resources, based at least in part on the priority.

Example 6

The method of any of examples 1 to 5, further comprising: aggregating the respective second sets of resource reservation information to be included in the additional resources.

Example 7

The method of any of examples 1 to 6, further comprising: using linear addition to combine at least some of the second sets of resource reservation information into a coded packet; and including as many coded packets as can fit within the additional resources.

Example 8

The method of any of examples 1 to 7, wherein at least one of the first set of resource reservation information or the second set of resource reservation information comprises a starting transmission time interval associated with a reserved resource set, an ending transmission time interval associated with the reserved resource set, a number of subchannels and a starting subchannel, a priority of the first wireless device or the second wireless device, a location information of the

Example 9

The method of any of examples 1 to 8, further comprising: determining to forward the one or more second transmission resources that are reserved by one or more second wireless devices based at least in part on a location of the first wireless device, a location of the one or more second wireless devices, a location of a receiving device, a network configuration, or some combination thereof, wherein the signal is transmitted to the receiving device based at least in part on the determination to forward the one or more second transmission resources.

Example 10

An apparatus comprising at least one means for performing a method of any of examples 1 to 9.

Example 11

An apparatus for wireless communications comprising a processor; and memory coupled with the processor, the processor and memory configured to perform a method of any of examples 1 to 9.

Example 12

A non-transitory computer-readable medium storing code for wireless communications, the code comprising instructions executable by a processor to perform a method of any of examples 1 to 9.

Example 13

A method for wireless communications at a first wireless device, comprising: receiving a signal from a second wireless device, wherein the signal comprises a first set of resource reservation information associated with one or more transmission resource reservations of the second wireless device and a second set of resource reservation information associated with one or more transmission resource reservations of one or more additional wireless devices; and determining whether the transmission resource reservations of the one or more additional wireless devices is to be excluded for use by the first wireless device.

Example 14

The method of example 13, wherein the second set of resource reservation information comprises a starting transmission time interval associated with the transmission resource reservation of the one or more additional wireless devices, an ending transmission time interval associated with the one or more additional wireless devices, a priority of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

Example 15

The method of any of examples 13 or 14, wherein the transmitter side protection parameter may include a distance, a RSRP, or some combination thereof.

Example 16

The method of any of examples 13 to 15, further comprising: refraining from transmitting during the transmission resource reservation of the one or more additional wireless devices based at least in part on at least one of the priority of the one or more additional wireless devices, or the distance or RSRP included in a protection parameter.

Example 17

The method of any of examples 13 to 16, wherein the first set of resource reservation information comprises a starting transmission time interval associated with the transmission resource reservation of the second wireless device, an ending transmission time interval associated with the transmission resource reservation of the second wireless device, a priority of the second wireless device, a transmitter side protection parameter associated with the second wireless device, a receiver side protection parameter associated with the second wireless device, or some combination thereof.

Example 18

The method of any of examples 13 to 17, further comprising: refraining from transmitting during the transmission resource reservation of the one or more additional wireless devices based at least in part on the receiver side protection parameter associated with the second wireless device, a RSRP associated with the second wireless device, a distance between the first wireless device and the second wireless device, and feedback received pertaining to communications with the second wireless device.

Example 19

The method of any of examples 13 to 18, further comprising: using a linear equation solving technique (e.g., Gaussian elimination) to recover the second set of resource reservation information associated with the transmission resource reservation of the one or more additional wireless devices that has not already been received at the first wireless device.

Example 20

An apparatus comprising at least one means for performing a method of any of examples 13 to 18.

Example 21

An apparatus for wireless communications comprising a processor; and memory coupled to the processor, the processor and memory configured to perform a method of any of examples 13 to 18.

Example 22

A non-transitory computer-readable medium storing code for wireless communications, the code comprising instructions executable by a processor to perform a method of any of examples 13 to 18.

It should be noted that the methods described herein describe possible implementations, and that the operations may be rearranged or otherwise modified and that other implementations are possible. Further, aspects from two or more of the methods may be combined.

Techniques described herein may be used for various wireless communications systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands or frequency channels as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications, comprising:
   selecting, by a first wireless device, a first transmission resource to be selected for transmission by the first wireless device and to be included in a first set of resource reservation information to be transmitted during a transmission interval;
   determining, by the first wireless device, one or more second transmission resources that are selected for transmission by one or more second wireless devices via respective second sets of resource reservation information; and
   transmitting, by the first wireless device, a signal during the transmission interval, wherein the signal includes the first set of resource reservation information, including the first transmission resource, during a first set of resources and at least one of the second sets of resource reservation information, including at least one of the one or more second transmission resources, during additional resources of the transmission interval.

2. The method of claim 1, further comprising:
   determining a priority associated with reservation of the one or more second transmission resources by the one or more second wireless devices, wherein the at least one of the second sets of resource reservation information is identified based at least on relative priorities.

3. The method of claim 2, wherein the priority is based at least on a distance between the first wireless device and each of the one or more second wireless devices.

4. The method of claim 2, wherein the priority is based at least on one or more reference signal received power (RSRP) parameters associated with the second sets of resource reservation information.

5. The method of claim 2, wherein the at least one of the second sets of resource reservation information included within the additional resources includes as many of the second sets of resource reservation information as will fit within the additional resources, based at least on the priority.

6. The method of claim 1, further comprising:
   aggregating the respective second sets of resource reservation information to be included in the additional resources.

7. The method of claim 6, wherein aggregating the respective second sets of resource reservation information comprises:
   using linear addition to combine at least some of the second sets of resource reservation information into a coded packet; and
   including as many coded packets as can fit within the additional resources.

8. The method of claim 1, wherein at least one of the first set of resource reservation information or the second set of resource reservation information comprises a starting transmission time interval associated with a reserved resource set, an ending transmission time interval associated with the reserved resource set, a number of subchannels and a starting subchannel, a priority of the first wireless device or the second wireless device, a location information of the first wireless device or the second wireless device, a transmitter side protection parameter, a receiver side protection parameter, or some combination thereof.

9. The method of claim 1, further comprising:
   determining to forward the one or more second transmission resources that are selected for transmission by one or more second wireless devices based at least on a location of the first wireless device, a location of the one or more second wireless devices, a location of a receiving device, a network configuration, or some combination thereof, wherein the signal is transmitted to the receiving device based at least on the determination to forward the one or more second transmission resources.

10. A method for wireless communications at a first wireless device, comprising:
    receiving a signal from a second wireless device, wherein the signal comprises a first set of resource reservation information associated with one or more transmission resource reservations of the second wireless device and a second set of resource reservation information associated with one or more transmission resource reservations of one or more additional wireless devices; and
    determining whether the one or more transmission resource reservations of the one or more additional wireless devices is to be excluded for use by the first wireless device.

11. The method of claim 10, wherein the second set of resource reservation information comprises a starting transmission time interval associated with the one or more transmission resource reservations of the one or more additional wireless devices, an ending transmission time interval associated with the one or more additional wireless devices, a priority of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

12. The method of claim 11, wherein the transmitter side protection parameter may include a distance, a reference signal receive power (RSRP), or some combination thereof.

13. The method of claim 12, further comprising:
refraining from transmitting during the one or more transmission resource reservations of the one or more additional wireless devices based at least on at least one of the priority of the one or more additional wireless devices, or the distance or RSRP included in a protection parameter.

14. The method of claim 10, wherein the first set of resource reservation information comprises a starting transmission time interval associated with the one or more transmission resource reservations of the second wireless device, an ending transmission time interval associated with the one or more transmission resource reservations of the second wireless device, a priority of the second wireless device, a transmitter side protection parameter associated with the second wireless device, a receiver side protection parameter associated with the second wireless device, or some combination thereof.

15. The method of claim 14, further comprising:
refraining from transmitting during the one or more transmission resource reservations of the one or more additional wireless devices based at least on the receiver side protection parameter associated with the second wireless device, a reference signal receive power (RSRP) associated with the second wireless device, a distance between the first wireless device and the second wireless device, and feedback received pertaining to communications with the second wireless device.

16. The method of claim 10, further comprising:
using a linear equation solving technique to recover the second set of resource reservation information associated with the one or more transmission resource reservations of the one or more additional wireless devices that has not already been received at the first wireless device.

17. An apparatus for wireless communications at a first wireless device, comprising: a processor; and memory coupled to the processor, the processor and memory configured to:
select a first transmission resource for transmission by the first wireless device and to be included in a first set of resource reservation information to be transmitted during a transmission interval;
determine one or more second transmission resources that are selected for transmission by one or more second wireless devices via respective second sets of resource reservation information; and
transmit a signal during the transmission interval, wherein the signal includes the first set of resource reservation information, including the first transmission resource, during a first set of resources and at least one of the second sets of resource reservation information, including at least one of the one or more second transmission resources, during additional resources of the transmission interval.

18. The apparatus of claim 17, wherein the processor and memory are further configured to:
determine a priority associated with reservation of the one or more second transmission resources by the one or more second wireless devices, wherein the at least one of the second sets of resource reservation information is identified based at least on relative priorities.

19. The apparatus of claim 18, wherein the priority is based at least on a distance between the first wireless device and each of the one or more second wireless devices.

20. The apparatus of claim 18, wherein the priority is based at least on one or more reference signal received power (RSRP) parameters associated with the second sets of resource reservation information.

21. The apparatus of claim 18, wherein the at least one of the second sets of resource reservation information included within the additional resources includes as many of the second sets of resource reservation information as will fit within the additional resources, based at least on the priority.

22. The apparatus of claim 17, wherein the processor and memory are further configured to:
aggregate the respective second sets of resource reservation information to be included in the additional resources.

23. The apparatus of claim 22, wherein the configuration of the processor and memory to aggregate the respective second sets of resource reservation information configures the processor and memory to:
use linear addition to combine at least some of the second sets of resource reservation information into a coded packet; and
include as many coded packets as can fit within the additional resources.

24. The apparatus of claim 17, wherein at least one of the first set of resource reservation information or the second set of resource reservation information comprises a starting transmission time interval associated with a reserved resource set, an ending transmission time interval associated with the reserved resource set, a number of subchannels and a starting subchannel, a priority of the first wireless device or the second wireless device, a location information of the first wireless device or the second wireless device, a transmitter side protection parameter, a receiver side protection parameter, or some combination thereof.

25. The apparatus of claim 17, wherein the processor and memory are further configured to:
determine to forward the one or more second transmission resources that are selected for transmission by one or more second wireless devices based at least on a location of the first wireless device, a location of the one or more second wireless devices, a location of a receiving device, a network configuration, or some combination thereof, wherein the signal is transmitted to the receiving device based at least on the determination to forward the one or more second transmission resources.

26. An apparatus for wireless communications at a first wireless device, comprising: a processor; memory coupled to the processor, the processor and memory configured to:
receive a signal from a second wireless device, wherein the signal comprises a first set of resource reservation information associated with one or more transmission resource reservations of the second wireless device and a second set of resource reservation information associated with one or more transmission resource reservations of one or more additional wireless devices; and
determine whether the one or more transmission resource reservations of the one or more additional wireless devices is to be excluded for use by the first wireless device.

27. The apparatus of claim 26, wherein the second set of resource reservation information comprises a starting transmission time interval associated with the one or more transmission resource reservations of the one or more additional wireless devices, an ending transmission time interval associated with the one or more additional wireless devices, a priority of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

28. The apparatus of claim 27, wherein the transmitter side protection parameter may include a distance, a reference signal receive power (RSRP), or some combination thereof.

29. The apparatus of claim 28, wherein the processor and memory are further configured to:
refrain from transmitting during the one or more transmission resource reservations of the one or more additional wireless devices based at least on at least one of the priority of the one or more additional wireless devices, or the distance or RSRP included in a protection parameter.

30. The apparatus of claim 26, wherein the first set of resource reservation information comprises a starting transmission time interval associated with the one or more transmission resource reservations of the second wireless device, an ending transmission time interval associated with the one or more transmission resource reservations of the second wireless device, a priority of the second wireless device, a transmitter side protection parameter associated with the second wireless device, a receiver side protection parameter associated with the second wireless device, or some combination thereof.

31. An apparatus for wireless communication at a first wireless device, comprising:
means for selecting a first transmission resource to be selected for transmission by the apparatus and to be included in a first set of resource reservation information to be transmitted during a transmission interval;
means for determining one or more second transmission resources that are selected for transmission by one or more second wireless devices via respective second sets of resource reservation information; and
means for transmitting a signal during the transmission interval, wherein the signal includes the first set of resource reservation information, including the first transmission resource, during a first set of resources and at least one of the second sets of resource reservation information, including at least one of the one or more second transmission resources, during additional resources of the transmission interval.

32. The apparatus of claim 31, further comprising:
means for determining a priority associated with reservation of the one or more second transmission resources by the one or more second wireless devices, wherein the at least one of the second sets of resource reservation information is identified based at least on relative priorities.

33. The apparatus of claim 31, wherein at least one of the first set of resource reservation information or the second set of resource reservation information comprises a starting transmission time interval associated with a reserved resource set, an ending transmission time interval associated with the reserved resource set, a number of subchannels and a starting subchannel, a priority of the first wireless device or the second wireless device, a location information of the first wireless device or the second wireless device, a transmitter side protection parameter, a receiver side protection parameter, or some combination thereof.

34. An apparatus for wireless communication at a first wireless device, comprising:
means for receiving a signal from a second wireless device, wherein the signal comprises a first set of resource reservation information associated with one or more transmission resource reservations of the second wireless device and a second set of resource reservation information associated with one or more transmission resource reservations of one or more additional wireless devices; and
means for determining whether the one or more transmission resource reservations of the one or more additional wireless devices is to be excluded for use by the apparatus.

35. The apparatus of claim 34, wherein the second set of resource reservation information comprises a starting transmission time interval associated with the one or more transmission resource reservations of the one or more additional wireless devices, an ending transmission time interval associated with the one or more additional wireless devices, a priority of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

36. A non-transitory computer-readable medium storing code for wireless communication at a first wireless device, the code comprising instructions executable by a processor to:
select a first transmission resource to be selected for transmission by the first wireless device and to be included in a first set of resource reservation information to be transmitted during a transmission interval;
determine one or more second transmission resources that are selected for transmission by one or more second wireless devices via respective second sets of resource reservation information; and
transmit a signal during the transmission interval, wherein the signal includes the first set of resource reservation information, including the first transmission resource, during a first set of resources and at least one of the second sets of resource reservation information, including at least one of the one or more second transmission resources, during additional resources of the transmission interval.

37. The non-transitory computer-readable medium of claim 36, the code further comprising instructions executable by the processor to:
determine a priority associated with reservation of the one or more second transmission resources by the one or more second wireless devices, wherein the at least one of the second sets of resource reservation information is identified based at least on relative priorities.

38. The non-transitory computer-readable medium of claim 36, wherein at least one of the first set of resource reservation information or the second set of resource reservation information comprises a starting transmission time interval associated with a reserved resource set, an ending transmission time interval associated with the reserved resource set, a number of subchannels and a starting subchannel, a priority of the first wireless device or the second wireless device, a location information of the first wireless device or the second wireless device, a transmitter side protection parameter, a receiver side protection parameter, or some combination thereof.

39. A non-transitory computer-readable medium storing code for wireless communication at a first wireless device, the code comprising instructions executable by a processor to:

receive a signal from a second wireless device, wherein the signal comprises a first set of resource reservation information associated with one or more transmission resource reservations of the second wireless device and a second set of resource reservation information associated with one or more transmission resource reservations of one or more additional wireless devices; and determine whether the one or more transmission resource reservations of the one or more additional wireless devices is to be excluded for use by the first wireless device.

40. The non-transitory computer-readable medium of claim 39, wherein the second set of resource reservation information comprises a starting transmission time interval associated with the one or more transmission resource reservations of the one or more additional wireless devices, an ending transmission time interval associated with the one or more additional wireless devices, a priority of each of the one or more additional wireless devices, a location of the one or more additional wireless devices, a transmitter side protection parameter associated with each of the one or more additional wireless devices, a receiver side protection parameter associated with each of the one or more additional wireless devices, or some combination thereof.

* * * * *